(12) United States Patent
Gonuguntla et al.

(10) Patent No.: US 12,250,626 B2
(45) Date of Patent: Mar. 11, 2025

(54) METHOD, A USER EQUIPMENT, AND A RADIO STATION FOR OPTIMIZING USER EQUIPMENT POWER CONSUMPTION ON ACTIVATED SECONDARY CELLS

(71) Applicant: NEC Corporation, Tokyo (JP)

(72) Inventors: Venkatarao Gonuguntla, Tokyo (JP); Hisashi Futaki, Tokyo (JP); Tetsu Ikeda, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 653 days.

(21) Appl. No.: 17/628,987

(22) PCT Filed: Mar. 22, 2021

(86) PCT No.: PCT/JP2021/011680
§ 371 (c)(1),
(2) Date: Jan. 21, 2022

(87) PCT Pub. No.: WO2021/200331
PCT Pub. Date: Oct. 7, 2021

(65) Prior Publication Data
US 2022/0264448 A1    Aug. 18, 2022

(30) Foreign Application Priority Data
Mar. 28, 2020    (IN) .............................. 202011013694

(51) Int. Cl.
*H04W 52/02* (2009.01)
*H04L 5/00* (2006.01)

(52) U.S. Cl.
CPC ....... *H04W 52/0206* (2013.01); *H04L 5/0032* (2013.01); *H04L 5/0048* (2013.01); *H04L 5/006* (2013.01)

(58) Field of Classification Search
CPC ............. H04W 52/0206; H04L 5/0032; H04L 5/0048; H04L 5/006
USPC ......................................................... 370/252
See application file for complete search history.

(56) References Cited

U.S. PATENT DOCUMENTS

| | | | |
|---|---|---|---|
| 11,343,812 B2* | 5/2022 | Park ..................... | H04W 72/23 |
| 11,678,235 B2* | 6/2023 | Cirik .................... | H04B 7/0695 |
| | | | 370/216 |
| 2015/0208269 A1 | 7/2015 | Damnjanovic et al. | |
| 2019/0090227 A1 | 3/2019 | Tsai et al. | |

(Continued)

FOREIGN PATENT DOCUMENTS

| | | |
|---|---|---|
| JP | 2019-057911 A | 4/2019 |
| WO | 2018/143390 A1 | 8/2018 |

OTHER PUBLICATIONS

International Search Report for PCT Application No. PCT/JP2021/011680, mailed on Jun. 1, 2021.

(Continued)

*Primary Examiner* — Gbemileke J Onamuti
(74) *Attorney, Agent, or Firm* — Sughrue Mion, PLLC

(57) ABSTRACT

The present disclosure provides an apparatus, and a method for optimizing user equipment (UE) power consumption on activated Secondary Cells during dormancy and non-dormancy behavior based on the first configuration and second configuration information as provided by radio station.

18 Claims, 13 Drawing Sheets

(56) References Cited

U.S. PATENT DOCUMENTS

2019/0356379 A1 11/2019 Takeda et al.
2020/0029316 A1 1/2020 Zhou et al.

OTHER PUBLICATIONS

3GPP TR 21.905: "Vocabulary for 3GPP Specifications" V15.0.0 (Mar. 2018), pp. 1-66.
3GPP TS 38.331: "Radio Resource Control (RRC) protocol specification" V15.7.0 (Sep. 2019), pp. 1-527.
3GPP TS 38.133: "Requirements for support of radio resource management" V16.2.0 (Dec. 2019), pp. 1-1129.
3GPP TS 38.211: "Physical channels and modulation" V15.7.0 (Sep. 2019), pp. 1-97.
3GPP TS 38.212: "Multiplexing and channel coding" V15.7.0 (Sep. 2019), pp. 1-101.
3GPP TS 38.213: "Physical layer procedures for control" V15.7.0 (Sep. 2019), pp. 1-108.
3GPP TS 38.214: "Physical layer procedures for data" V15.7.0 (Sep. 2019), pp. 1-106.
3GPP TS 38.321: "Medium Access Control (MAC) protocol specification" V15.7.0 (Sep. 2019), pp. 1-78.
Japanese Office Communication for JP Application No. 2021-573277 mailed on Dec. 13, 2022 with English Translation.
Qualcomm Incorporated, "Fast SCell Activation and SCell Dormancy", 3GPP TSG RAN WG1 #98bis R1-1911139, Oct. 20, 2019.
Extended European Search Report for EP Application No. EP21779719.0 dated on Jul. 15, 2022.

* cited by examiner

METHOD, A USER EQUIPMENT, AND A RADIO STATION FOR OPTIMIZING USER EQUIPMENT POWER CONSUMPTION ON ACTIVATED SECONDARY CELLS

This application is a National Stage Entry of PCT/JP2021/011680 filed on Mar. 22, 2021, which claims priority from Indian Patent Application 202011013694 filed on Mar. 28, 2020, the contents of all of which are incorporated herein by reference, in their entirety.

TECHNICAL FIELD

The present disclosure generally relates to wireless communication networks, and more particularly, to an apparatus, and a method for optimizing user equipment (UE) power consumption on activated Secondary Cells.

BACKGROUND ART

Various abbreviations that may appear in the specification and/or in the drawing figures are defined as follows:

List of Abbreviations

5GC 5G Core Network
5GS 5G System
5QI 5G QoS Identifier
AGC Automatic Gain Control
AMF Access and Mobility Management Function
AS Access Stratum
ASN1 Abstract Syntax Notation One
BWP Bandwidth Part
CORESET Control Resource SET
CP Cyclic Prefix
CSI Channel State Information
CSI-RS Channel State Information-Reference Signals
DL Downlink
MAC Medium Access Control
MAC CE MAC Control Element
NG-RAN Next Generation Radio Access Network
NR New Radio/NR radio access
PBCH Physical Broadcast Channel
PDCCH Physical Downlink Control Channel
PDSCH Physical Downlink Shared Channel
PUCCH Physical Uplink Control Channel
PUSCH Physical Uplink Shared Channel
QCL Quasi Co Location
(R)AN (Radio) Access Network
RRC Radio Resource Control
RS Reference Signal
SA NR Standalone NR
SCS Sub Carrier Spacing
SS Synchronization Signal
SSB SS/PBCH Block
TCI Transmission Configuration Indication
UE User Equipment
UL Uplink
USIM Universal Subscriber Identity Module For the purposes of the present application, the terms and definitions given in 3GPP TR 21.905 and the following apply. A term defined in the present document takes precedence over the definition of the same term, if any, in 3GPP TR 21.905.

The following documents are hereby incorporated by reference into the present disclosure as if fully set forth herein: 3GPP TR 21.905: "Vocabulary for 3GPP Specifications" V15.0.0 (2018-03); 3GPP TS 38.331: "Radio Resource Control (RRC) protocol specification" V15.7.0; 3GPP TS 38.133: "Requirements for support of radio resource management"; 3GPP TS 38.211: "Physical channels and modulation" V15.7.0; 3GPP TS 38.212: "Multiplexing and channel coding" V15.7.0; 3GPP TS 38.213: "Physical layer procedures for control" V15.70; 3GPP TS 38.214: "Physical layer procedures for data" V15.7.0; and 3GPP TS 38.321: "Medium Access Control (MAC) protocol specification" V15.7.0.

A fifth generation (5G) wireless communication technology [which can be referred to as new radio (NR)] is envisaged to expand and support diverse usage scenarios and applications with respect to current mobile network. In an aspect, 5G communication can include enhanced mobile broadband addressing human-centric-use cases for access to multimedia content, services and data; ultra-low latency (ULL) with high reliability; and massive machine-type communications which can allow a very large number of connected devices and transmission of a relatively low volume of non-delay-sensitive information. However, as the demand for mobile broadband access continues to increase, further improvements in NR communication technology and beyond may be desired.

Measurement Framework:

In NR, UE transmits different kinds of channel state information (CSI) and cell quality information from time to time using CSI reporting framework and Layer 3 (L3) measurements framework. CSI framework is a L1 mechanism, and it is transmitted from user equipment (UE) to radio station using L1 layer (Physical layer or PHY layer). L3 measurements framework as the name suggests is a L3 mechanism and transmitted using L3 layer (RRC layer) from UE to radio station.

CSI Reporting Framework:

The CSI reporting framework consists of CSI related measurements (which consists of Channel Quality Information (CQI), Precoding Matrix Indicator (PMI), Rank Indicator (RI), Layer Indicator (LI)), L1-RSRP related measurements (RSRP using CSI-RS and RSRP using SSB) and Resource indicators (which consists of CSI-RS Resource Indicator (CRI), SS/PBCH
Resource Indicator (SSBRI)).

CSI reportQuantity, which provides information on the report quantity, is provided to UE through RRC message CSI-ReportConfig. The Abstract Syntax Notation One (ASN1) of Information Element (IE) of CSI-ReportConfig is given in TS 38.331.

SUMMARY OF INVENTION

Technical Problem

In NR, UE can be provided or added with multiple secondary cells (hereinafter referred as 'SCell'). However, to reduce UE power consumption, all the added SCell(s) are not activated always. Upon addition, SCell(s) are in deactivated state and they are activated at a later point based on the network indication. When UE has more data to be transmitted/received, network may activate the SCell, and when there is not much of data expected for UE, network may deactivate the SCell. However, there is a cost associated with the activation and deactivation process.

In addition to cost, transition of SCell from deactivated to activated state also involves significant amount delay as the UE has to perform measurements for automatic gain control (AGC), channel state information (CSI), time and frequency tracking, etc. to come to active state. However, in some scenarios, where the UE traffic needs to be served quickly, the delay involved for activating a SCell may have impact on network capacity. Hence, at least in those scenarios it is desirable to bring the SCell to active state as quickly as possible. In order, to facilitate this, NR Release 16, introduces SCell dormancy (or dormancy SCell) framework.

During SCell dormancy, instead of deactivating a SCell to reduce UE power consumption, the network introduces a special behavior within the SCell active state itself. When there is a special behavior introduced, regular behavior needs to be differentiated from special behavior. Hence, for an active SCell, special behavior is called as dormancy behavior and regular or legacy SCell active state behavior is called as non-dormancy behavior.

With the introduction of this special behavior on active SCell, whenever there is not much of data expected for UE on particular SCell, SCell can be moved to dormancy behavior instead of deactivated state.

Since dormancy behavior is introduced to reduce UE power consumption on activated SCell, UE is not expected to transmit or receive data on the dormancy SCell. Therefore, to move the dormancy SCell to non-dormancy SCell without delay, UE performs CSI measurements, AGC gain tuning and beam management as configured by the network.

Measurements in dormancy behavior are useful to speed up the dormancy to non-dormancy transition on SCell. In some scenarios, these measurements in dormancy behavior are useful to facilitate faster data scheduling upon SCell transition to non-dormancy behavior. However, in some other scenarios these measurements are not used for any data transmission until the SCell is moved to non-dormancy behavior. Therefore, using the same kind of measurement reporting for both dormancy and non-dormancy behavior of SCell leads to wastage of measurement reporting resources such as radio resources and power.

However current 3GPP standard(s) does not specify different mechanisms for CSI measurement and/or reporting of for SCells in dormancy and non-dormancy.

Thereupon, the present invention has been accomplished in consideration of the above-mentioned problems, and an object thereof is to provide a radio communication system, a radio terminal, a radio network, a radio communication method, and a program therefor capable of collecting information that the radio network side requires while alleviating a load on the terminal caused by the measurement and/or the reporting, and/or deleting the reporting of the information with a low necessity.

The following presents a simplified summary of the subject matter in order to provide a basic understanding of some aspects of subject matter aspects. This summary is not an extensive overview of the subject matter. It is not intended to identify key/critical elements of the aspects or to delineate the scope of the subject matter.

Its sole purpose is to present some concepts of the subject matter in a simplified form as a prelude to the more detailed description that is presented later.

It is therefore a primary objective of this disclosure to provide an apparatus, and a method for optimizing user equipment (UE) power consumption on activated Secondary Cells.

It is another objective of the present disclosure is to save radio resources and transmission power without dormancy behavior performance being affected.

It is another objective of the present invention to reduce the overall cost of wireless communication.

Solution to Problem

According to the preferred aspect, the present invention provides a method implemented in a user equipment (UE), for reporting channel state information (CSI) of one or more secondary serving cells (SCells), wherein the method comprising receiving, from a radio station, a first configuration information for CSI reporting; measuring power of at least one beam transmitted on one or more SCells for the CSI reporting during dormancy behaviour on the SCells; and performing the CSI reporting comprising beam index of the beam without the power of corresponding beam to the radio station based on the first configuration information. The dormancy behaviour is characterized in that the UE does not monitor downlink control channel or monitors the downlink control channel fewer times on the SCells.

The present invention further provides a method implemented in a user equipment (UE), for receiving, from the radio station, second configuration information for the CSI reporting, wherein the second configuration information configures the UE to report the beam index with the power of corresponding beam in the CSI report. The second configuration information is applied for the CSI reporting during non-dormancy behavior.

The present invention provides a method implemented in a user equipment (UE), for receiving, from the radio station, a signaling information to switch from the non-dormancy behavior to the dormancy behavior; and performing the CSI reporting based on the first configuration information, in response to the signaling information.

The present invention provides a method implemented in a user equipment (UE), for receiving, from the radio station, an indicator indicating whether the UE uses the first configuration information or the second configuration information for the CSI reporting; wherein the CSI reporting, comprising the beam index of at least one beam without the power of corresponding beam to the radio station, in a case where the indicator indicates to use the first configuration information; or the CSI reporting, comprising the beam index and the power of the beam to the radio station, in a case where the indicator indicates to use the second configuration information.

In another aspect, the present disclosure provides a user equipment, UE, comprising at least one transceiver; and at least one processor; wherein the processor is configured to receive, from a radio station, a first configuration information for channel state information, CSI, reporting; measure power of at least one beam transmitted on one or more secondary serving cells, SCells, for the CSI reporting during dormancy behavior on the SCells; and perform the CSI reporting comprising beam index of the beam without the power of corresponding beam, to the radio station based on the first configuration information.

In another aspect, the present disclosure provides a method implemented in a radio station, for configuring channel state information, CSI, reporting of one or more secondary serving cells, SCells, during dormancy behaviour on the SCells of a user equipment, UE, the method comprising transmitting, to the UE, a first configuration information for the CSI reporting; receiving, from the UE, the CSI reporting during dormancy behaviour on one or more SCells; wherein the CSI reporting comprising beam index of at least one beam on the SCells without power of corresponding beam based on the first configuration information.

In another aspect, the present disclosure provides a radio station comprising at least one transceiver; and at least one processor; wherein the at least one processor is configured to transmit, to a user equipment, UE, a first configuration information for channel state information, CSI, reporting of one or more secondary cells, SCells, during dormancy behaviour by the UE; receive, from the UE, the CSI report comprising beam index of at least one beam on the one or more SCells without power of corresponding beam based on the first configuration information.

These and other objects, aspects and advantages of the present disclosure will become readily apparent to those skilled in the art from the following detailed description of the aspects having reference to the attached figures, the disclosure not being limited to any particular aspects disclosed.

BRIEF DESCRIPTION OF DRAWINGS

For a better understanding of the aspects of the systems and methods described herein, and to show more clearly how they may be carried into effect, reference will now be made, by way of example, to the accompanying drawings, wherein.

DESCRIPTION OF EMBODIMENTS

Figure 1:
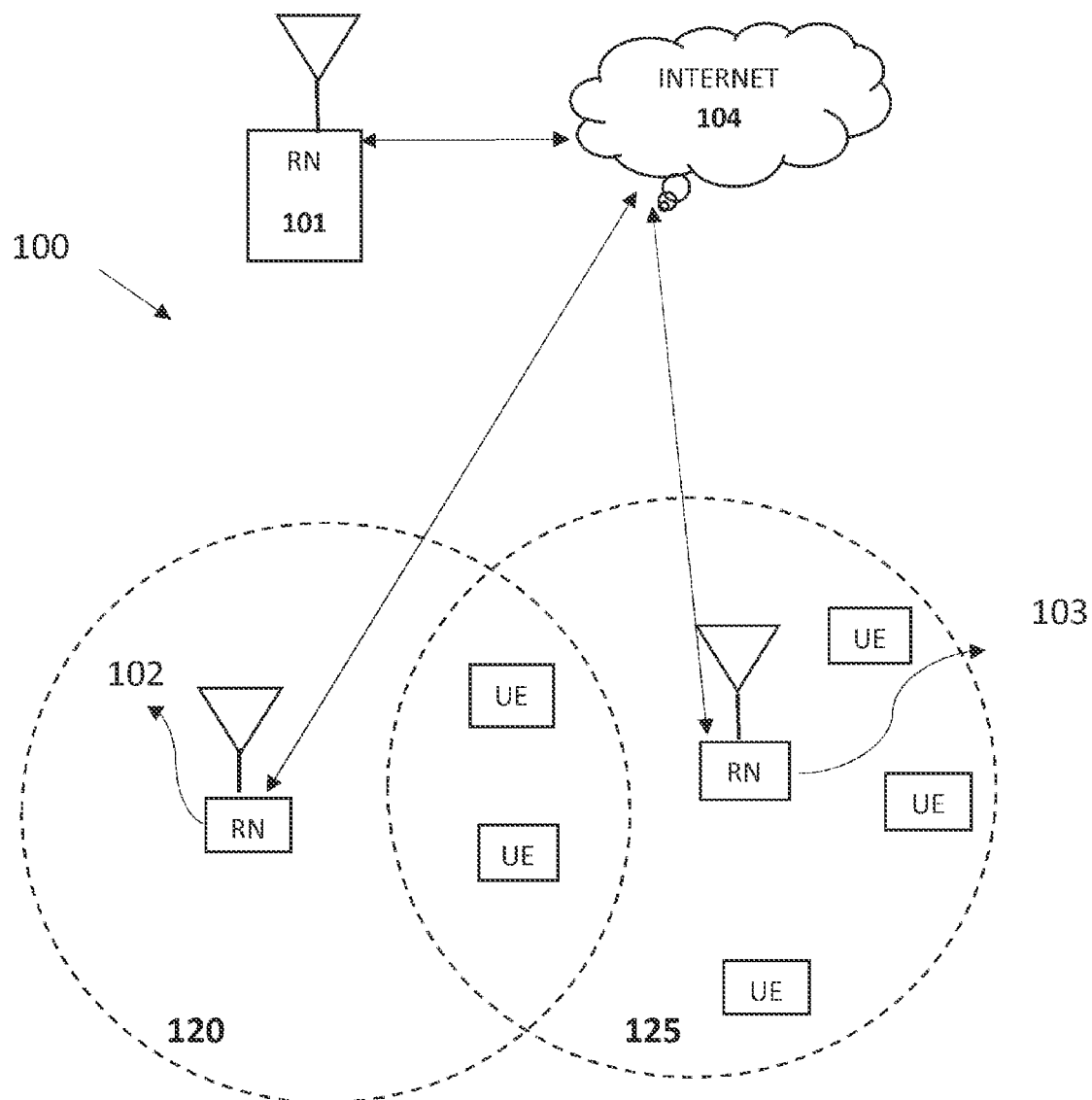
FIG. 1 illustrates an example wireless network according to aspects of the present disclosure.

Exemplary aspects now will be described with reference to the accompanying drawings. The disclosure may, however, be embodied in many different forms and should not be construed as limited to the aspects set forth herein; rather, these aspects are provided so that this disclosure will be thorough and complete, and will fully convey its scope to those skilled in the art. The terminology used in the detailed description of the particular exemplary aspects illustrated in the accompanying drawings is not intended to be limiting. In the drawings, like numbers refer to like elements.

The specification may refer to "an", "one" or "some" aspect(s) in several locations. This does not necessarily imply that each such reference is to the same aspect(s), or that the feature only applies to a single aspect. Single features of different aspects may also be combined to provide other aspects.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

The features provided by the disclosed system in the present disclosure, may be accessed remotely, in one or more aspects, and/or through an online service provider. Such types of online service providers operates and maintains the computing systems and environment, such as server system and architectures, that promote the delivery of portable electronic documents in a communication network. Typically, server architecture includes the infrastructure (e.g. hardware, software, and communication lines) that offers online services.

The detailed description follows in parts to terms of processes and symbolic representations of operations performed by conventional computers, including computer components. For the purpose of this disclosure, a computer may be any microprocessor or processor (hereinafter referred to as processor) controlled device such as, by way of example, personal computers, workstations, servers, clients, minicomputers, main-frame computers, laptop computers, a network of one or more computers, mobile computers, portable computers, handheld computers, palm top computers, set-top boxes for a TV, interactive televisions, interactive kiosks, personal digital assistants, interactive wireless devices, mobile browsers, or any combination thereof.

For the most part, the operations described herein are operations performed by a computer or a machine in conjunction with a human operator or user that interacts with the computer or the machine. The programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein.

It would be well appreciated by persons skilled in the art that the term "module" and "unit" can be interchangeably used in the present disclosure.

An Aspect of the Present Disclosure:

To avoid the wastage of the measurement reporting resources and power, the following measurements are necessary in dormancy and non-dormancy behavior.

In non-dormancy behavior, UE CSI measurement report for beam management comprises of beam index, beam strength (RSRP), and therefore it is called as 'Full measurement report'. Beam strength helps network to know how better the next best beam is for beam switching and helps the network to determine the best beam among the reported set of beams, and switches the serving beam if required.

In dormancy-behavior, the network requires the knowledge of UE beam index of SCell that is best suited to enable the faster transition from dormancy to non-dormancy. The beam index is derived (by the network) by comparing the UE reported measurement values. When there are multiple SCell(s) in dormancy behavior, and only one or few SCells required to be transitioned to non-dormancy behavior, knowledge of beam strength (of each SCell) may help the network to select the SCell and the beam index of the SCell to transition to non-dormancy behavior.

UE enters dormancy behavior on the SCell(s) once it completes BWP switch to dormant BWP. UE is not expected to track data or control channel on the dormancy SCell in both uplink and downlink. However to facilitate the faster transition from dormancy to non-dormancy behavior, UE is expected to perform AGC, time/frequency tracking, and CSI measurements (as per the measurement and reporting configuration). The CSI beam measurement reports configured during SCell dormancy may be periodic, aperiodic, or semi-static, which depends on the configuration by the network. The CSI report(s) of the dormancy SCell are transmitted on the primary cell using cross carrier scheduling framework.

During dormancy behavior, since the UE CSI beam measurement reports are not used for data transfer, UE do not have to report full measurement report of beam index and beam strength. It is sufficient if UE reports index report that contain beam index alone as per the configuration from network configured by the network entity. Thus, a UE can explicitly suggest the best possible beam index, performing the necessary comparison of the measured values (of beam strengths across different SCells) at the UE itself, and just report the selected beam index, or list of sorted beam indices. The CSI measurement report that contains only beam index(es) without beam strength is called as 'Index Measurement Report' or 'Index Report' or 'Beam Index Measurement Report' or 'Beam Index Report'.

FIG. 1 illustrates an example wireless network according to aspects of the present disclosure. The aspect of the wireless network shown in FIG. 1 is for illustration only. Other aspects of the wireless network 100 could be used without departing from the scope of this disclosure.

As shown in FIG. 1, the wireless network includes Radio Stations (101, 102, and 103). The Radio Station 101 communicates with the Radio Station 102 and the Radio Station 103. The Radio Station 101 also communicates with at least one network 104, such as the Internet, a proprietary Internet Protocol (IP) network, or other data network.

The Radio Station 102 provides wireless broadband access to the network 104 for a first plurality of user equipments (UEs) within a coverage area 120 of the Radio Station 102. The first plurality of UEs includes a UE, which may be located in a small business; in an enterprise; in a WiFi hotspot; in a residence; and a UE, which may be a mobile device, such as a cell phone, a wireless laptop, a wireless PDA, or the like. The Radio Station 103 provides wireless broadband access to the network 130 for a second plurality of UEs within a coverage area 125 of the Radio Station 103. In some aspects, one or more of the Radio Stations 101-103 may communicate with each other and with the UEs using 5G/NR, LTE, LTE-A, WiMAX, WiFi, or other wireless communication techniques.

It will be appreciated by a person skilled in the art that depending on the network type, the term "radio Station" or "RS" can refer to any component (or collection of components) configured to provide wireless access to a network, such as transmit point (TP), transmit-receive point (TRP), a base station, an enhanced base station (eNodeB or eNB), a 5G base station (gNodeB or gNB), a macrocell, a femtocell, a WiFi access point (AP), or other wirelessly enabled devices. Radio Stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "Radio Station" and "gNB" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a Radio Station, whether the UE is a mobile device (such as a mobile telephone or smartphone) or is normally considered a stationary device (such as a desktop computer or vending machine).

Dotted lines show the approximate extents of the coverage areas, which are shown as approximately circular for the purposes of illustration and explanation only. It should be clearly understood that the coverage areas associated with Radio Stations, such as the coverage areas, may have other shapes, including irregular shapes, depending upon the configuration of the Radio Stations and variations in the radio environment associated with natural and man-made obstructions.

As described in more detail below, one or more of the UEs include circuitry, programming, or a combination thereof, for efficient CSI reporting on PUCCH in an advanced wireless communication system. In certain aspects, and one or more of the Radio Stations 101-103 includes circuitry, programming, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of Radio Stations and any number of UEs in any suitable arrangement. Also, the Radio Station 101 could communicate directly with any number of UEs and provide those UEs with wireless broadband access to the network 130. Similarly, each Radio Station 102-103 could communicate directly with the network 130 and provide UEs with direct wireless broadband access to the network 130. Further, the Radio Stations 101, 102, and/or 103 could provide access to other or additional external networks, such as external telephone networks or other types of data networks.

Figure 2:
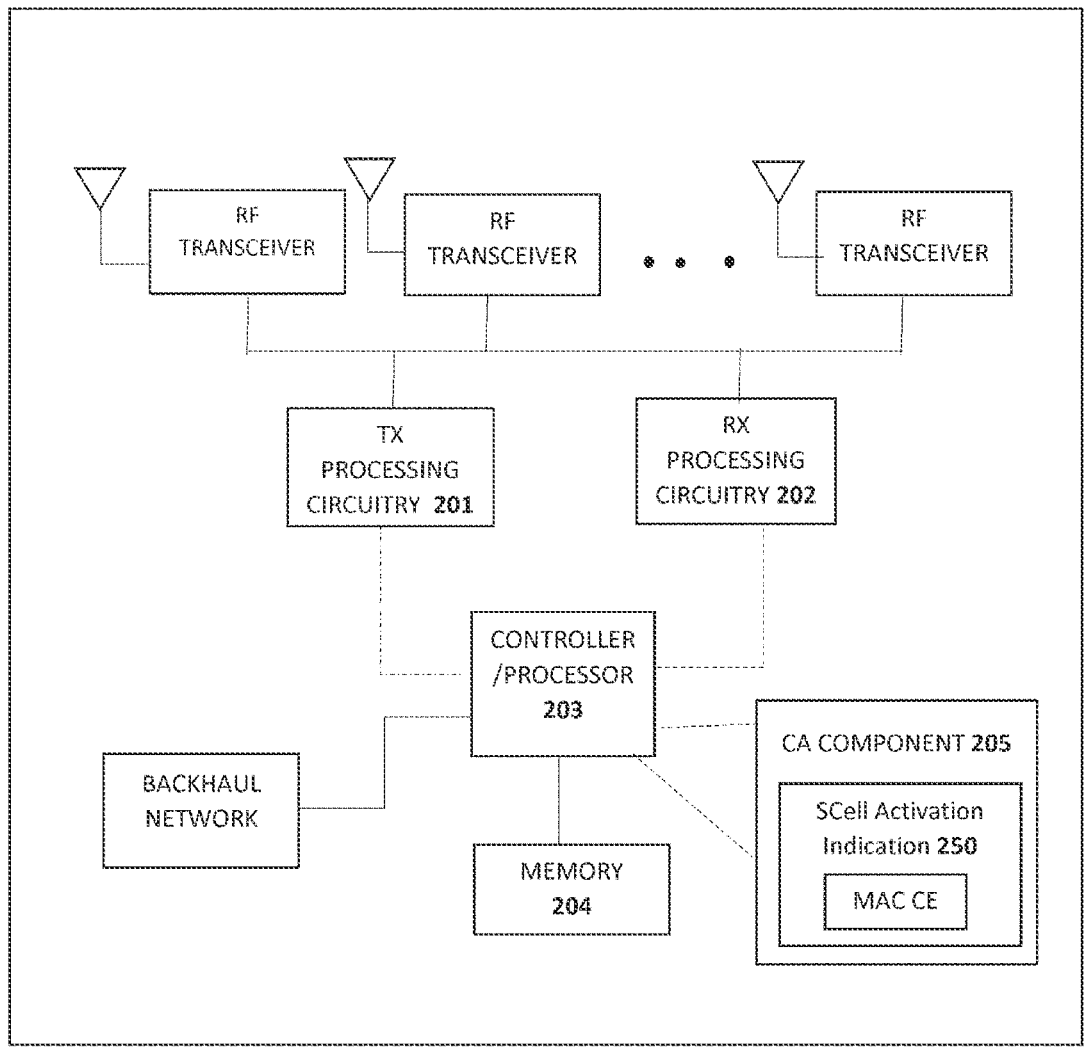
FIG. 2 illustrates an exemplary aspect of a radio Station (RS) according to aspects of the present disclosure.

FIG. 2 illustrates an exemplary aspect of a Radio Station 102 according to aspects of the present disclosure. The aspect of the Radio Station 102 illustrated in FIG. 2 is for illustration only, and the Radio Stations 101 and 103 of FIG. 1 could have the same or similar configuration. However, Radio Stations come in a wide variety of configurations, and FIG. 2 does not limit the scope of this disclosure to any particular implementation of a Radio Station.

As shown in FIG. 2, the Radio Station 102 includes multiple antennas, multiple RF transceivers, transmit (TX) processing circuitry 201, and receive (RX) processing circuitry 202. The Radio Station 102 also includes one or more controller(s)/processor(s) 203, a memory 204, and a backhaul or network interface. The one or more controller(s)/processor(s) 203 may operate in conjunction with cell activation component 205. The cell activation component 205 further includes secondary cell indication and MAC control element to enable one or more of the functions described herein.

The RF transceivers receive, from the antennas, incoming RF signals, such as signals transmitted by UEs in the network 100. The RF transceivers down-convert the incoming RF signals to generate baseband signals. The baseband signals are sent to the RX processing circuitry 202, which generates processed baseband signals by filtering, decoding, and/or digitizing the baseband signals. The RX processing circuitry 202 transmits the processed baseband signals to the controller/processor 203 for further processing.

In some aspects, the RF transceiver is capable of transmitting configuration information including beam identifications (IDs) associated with beams (either transmitted from gNB or transmitted from UE) and the beams conveyed on different orthogonal frequency division multiplexing (OFDM) symbols.

In some aspects, the RF transceiver is capable of transmitting the beams conveyed on different slots, the beams including different beam IDs, respectively.

The TX processing circuitry 201 receives analog or digital data (such as voice data, web data, e-mail, or interactive video game data) from the controller/processor 203. The TX processing circuitry 201 encodes, multiplexes, and/or digitizes the outgoing baseband data to generate processed baseband signals. The RF transceivers receive the outgoing processed baseband signals from the TX processing circuitry 201 and up-converts the baseband to RF signals that are transmitted via the antennas.

The controller/processor 203 can include one or more processors or other processing devices that control the overall operation of the Radio Station 102. For example, the controller/processor 203 could control the reception of forward channel signals and the transmission of reverse channel signals by the RF transceivers, the RX processing circuitry 202, and the TX processing circuitry 201 in accordance with well-known principles. The controller/processor 203 could support additional functions as well, such as more advanced wireless communication functions. For instance, the controller/processor 203 could support beam forming or directional routing operations in which outgoing signals from multiple antennas are weighted differently to effectively steer the outgoing signals in a desired direction. Any of a wide variety of other functions could be supported in the Radio Station 102 by the controller/processor 203.

The controller/processor 203 is also capable of executing programs and other processes resident in the memory 204, such as an OS. The controller/processor 204 can move data into or out of the memory 204 as required by an executing process.

The memory 204 is coupled to the controller/processor 203. Part of the memory 204 could include a RAM, and another part of the memory 204 could include a Flash memory or other ROM.

Although FIG. 2 illustrates one example of Radio Station 102, various changes may be made to FIG. 2. For example, the Radio Station 102 could include any number of each component shown in FIG. 2. As a particular example, an access point could include a number of interfaces, and the controller/processor could support routing functions to route data between different network addresses. As another particular example, while shown as including a single instance of TX processing circuitry and a single instance of RX processing circuitry, the Radio Station 102 could include multiple instances of each (such as one per RF transceiver). Also, various components in FIG. 2 could be combined, further subdivided, or omitted and additional components could be added according to particular needs.

Figure 3:
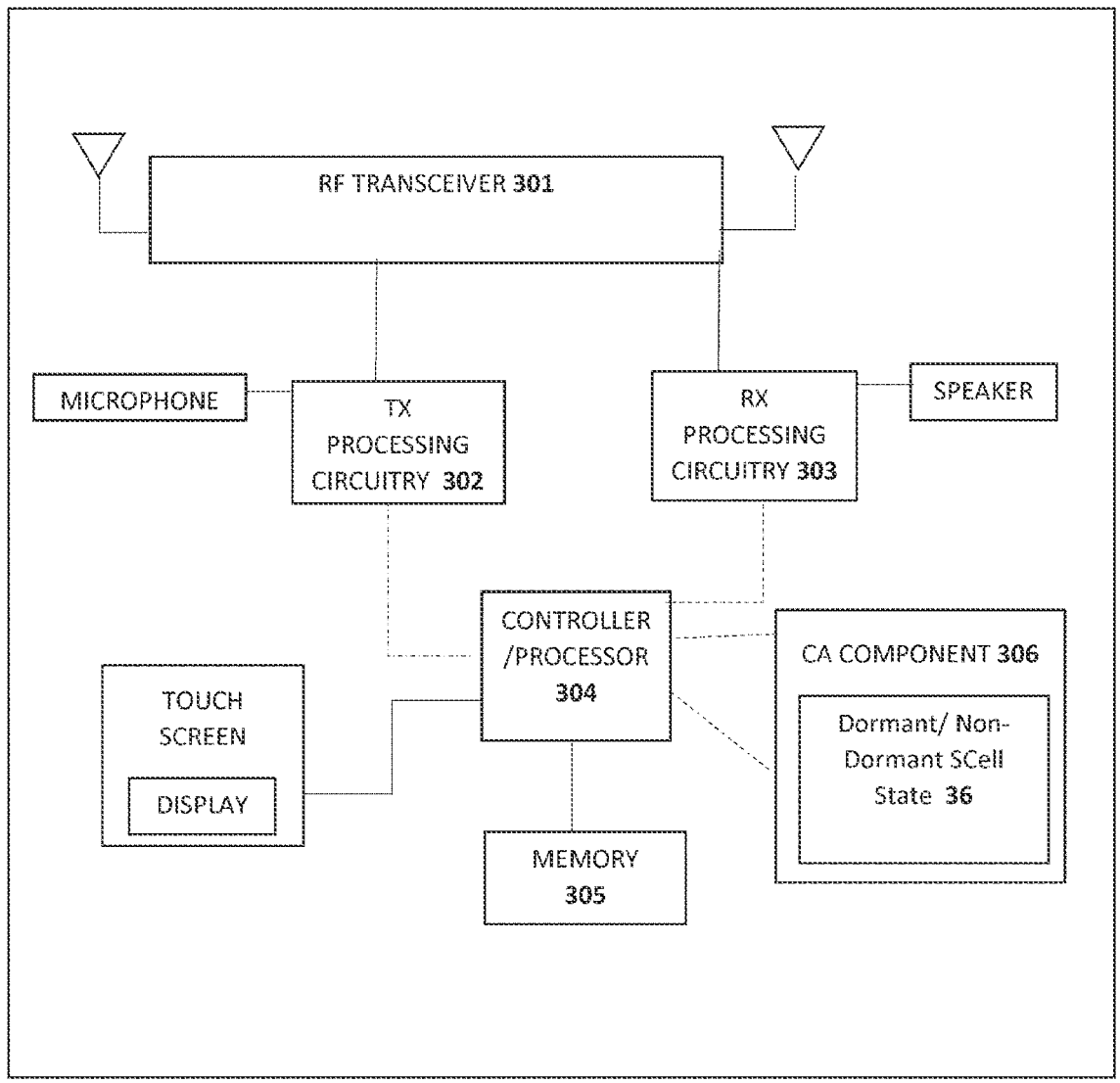
FIG. 3 illustrates an exemplary aspect of a user equipment (UE) in accordance with the aspects of the present disclosure.

FIG. 3 illustrates an exemplary aspect of a user equipment (UE) in accordance with the aspects of the present disclosure. The aspect of the UE illustrated in FIG. 3 is for illustration only, and the plurality of UEs of FIG. 1 could have the same or similar configuration. However, UEs come in a wide variety of configurations, and FIG. 3 does not limit the scope of this disclosure to any particular implementation of a UE.

As shown in FIG. 3, the UE includes an antenna, a radio frequency (RF) transceiver 301, TX processing circuitry 302, a microphone, and receive (RX) processing circuitry 303. The UE also includes a speaker, one or more controller(s)/processor(s) 304, an input/output (I/O) interface, a touchscreen, a display, and a memory 305. The memory 305 includes an operating system (OS) and one or more applications.

The RF transceiver 301 receives, from the antenna, an incoming RF signal transmitted by an Radio Station of the network 100. The RF transceiver 301 down-converts the incoming RF signal to generate a baseband signal. The baseband signal is sent to the RX processing circuitry 303, which generates a processed baseband signal by filtering, decoding, and/or digitizing the baseband signal. The RX processing circuitry 303 transmits the processed baseband signal to the speaker (such as for voice data) or to the processor 304 for further processing (such as for web browsing data).

In some aspects, the RF transceiver 301 is capable of receiving configuration information including beam identifications (IDs) associated with radio station beams and the beams conveyed on different orthogonal frequency division multiplexing (OFDM) symbols, wherein the beams include different beam IDs, respectively.

In some aspects, the RF transceiver 301 is capable of receiving the beams conveyed on different slots, wherein the beams include different beam IDs, respectively, included in the configuration information.

The TX processing circuitry 302 receives analog or digital voice data from the microphone or other outgoing baseband data (such as web data, e-mail, or interactive video game data) from the processor 340. The TX processing circuitry 302 encodes, multiplexes, and/or digitizes the outgoing baseband data to generate a processed baseband signal. The RF transceiver 301 receives the outgoing processed baseband signal from the TX processing circuitry 302 and up-converts the baseband signal to an RF signal that is transmitted via the antenna.

The controller/processor 304 can include one or more processors or other processing devices and execute the OS stored in the memory in order to control the overall operation of the UE. For example, the processor could control the reception of forward channel signals and the transmission of reverse channel signals by the RF transceiver, the RX processing circuitry, and the TX processing circuitry in accordance with well-known principles. In some aspects, the processor includes at least one microprocessor or microcontroller.

The processor 304 is also capable of executing other processes and programs resident in the memory 305, such as processes for CSI reporting on PUCCH. The processor 304 can move data into or out of the memory 305 as required by an executing process. In some aspects, the processor 304 is configured to execute the applications based on the OS or in response to signals received from Radio Stations or an operator. The processor 304 is also coupled to the I/O interface, which provides the UE with the ability to connect to other devices, such as laptop computers and handheld computers. The I/O interface is the communication path between these accessories and the processor.

The processor 304 is also coupled to the touchscreen and the display. The operator of the UE can use the touchscreen to enter data into the UE. The display may be a liquid crystal display, light emitting diode display, or other display capable of rendering text and/or at least limited graphics, such as from web sites.

In some aspects, the controller/processor 304, memory 305 and transceiver 301 in communication, may operate in conjunction with carrier aggregation component 306 to support dormant/non-dormant secondary serving cell state 360 as described herein.

In some aspects, the processor 340 is capable of measuring the beams based on a beam reference signal (BRS) and a channel state information-reference signal (CSI-RS) received from the Radio Station and performing an beam cycling operation for the measured beams to receive downlink channels.

In some aspects, the processor 304 is capable of monitoring the downlink channels based on the received beams conveyed on different slots.

The memory 305 is coupled to the processor 304. Part of the memory 305 could include a random access memory (RAM), and another part of the memory 305 could include a Flash memory or other read-only memory (ROM).

Although FIG. 3 illustrates one example of UE, various changes may be made to FIG. 3. For example, various components in FIG. 3 could be combined, further subdivided, or omitted and additional components could be added according to particular needs. As a particular example, the processor 304 could be divided into multiple processors, such as one or more central processing units (CPUs) and one or more graphics processing units (GPUs). Also, while FIG. 3 illustrates the UE configured as a mobile telephone or smartphone, UEs could be configured to operate as other types of mobile or stationary devices.

Figure 4:
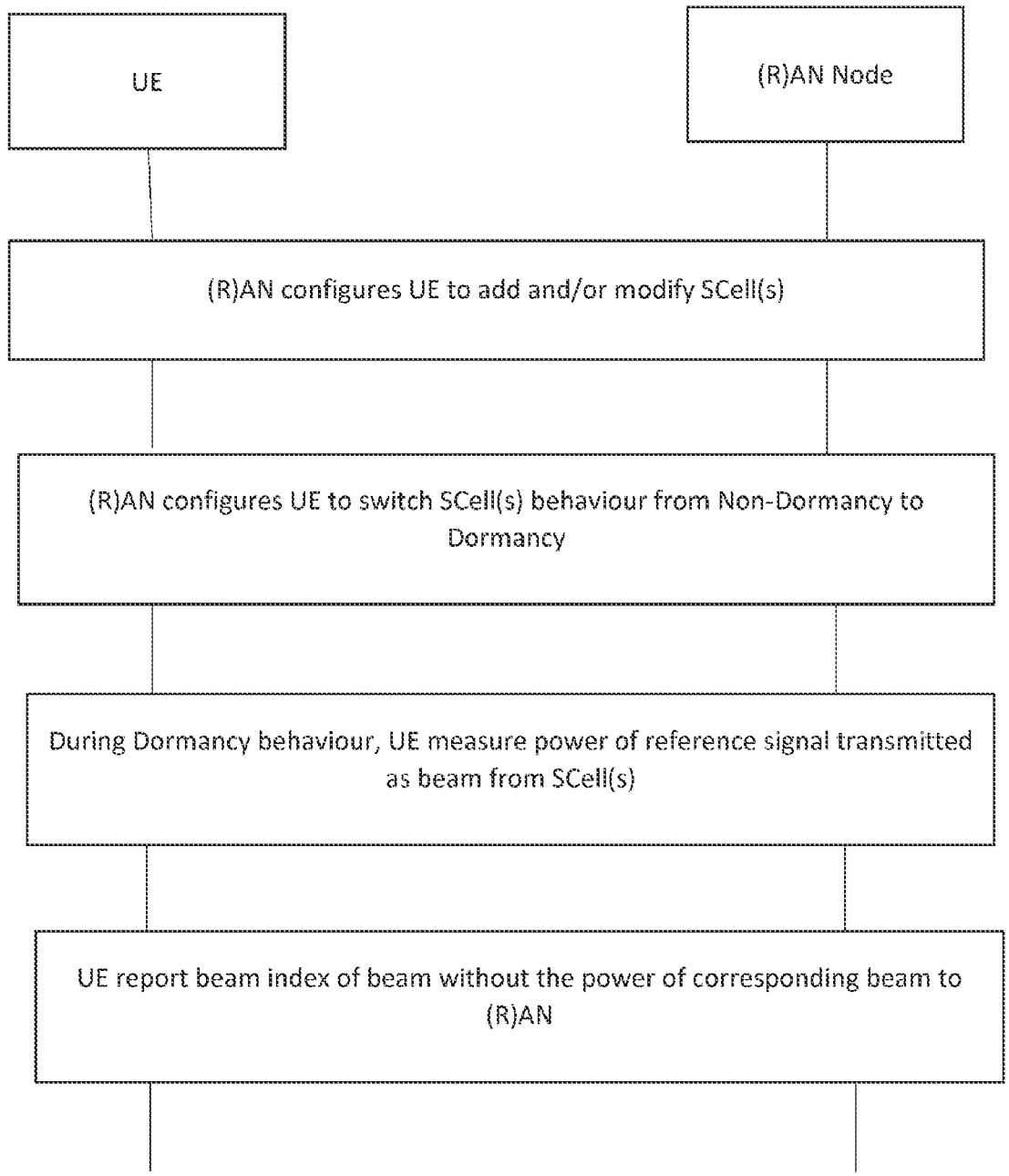
FIG. 4 illustrates signaling flow to facilitate the CSI measurement reporting of one or more Secondary Cell(s) during dormancy behavior by user equipment (UE) in accordance with the aspects of present disclosure.

First Aspect of the present disclosure: FIG. 4 illustrates signaling flow to facilitate the CSI measurement reporting of one or more Secondary Cell(s) (SCell(s)) during dormancy behavior by user equipment (UE) in accordance with a first aspect of the present disclosure.

Radio Station or gNB may configure UE with RRC Connection Reconfiguration message to add and/or modify SCell(s). The RRC Connection Reconfiguration message to add and/or modify SCell(s) may also contain CSI measurement configuration. CSI measurement configuration of SCell contains reference signal configuration on which measurement have to be performed.

In a dormancy behavior on SCell(s), UE measures power of reference signal(s) of corresponding beam(s) from SCell(s). And UE report beam index of the beam without the power of corresponding the beam to Radio Station.

Figure 5:
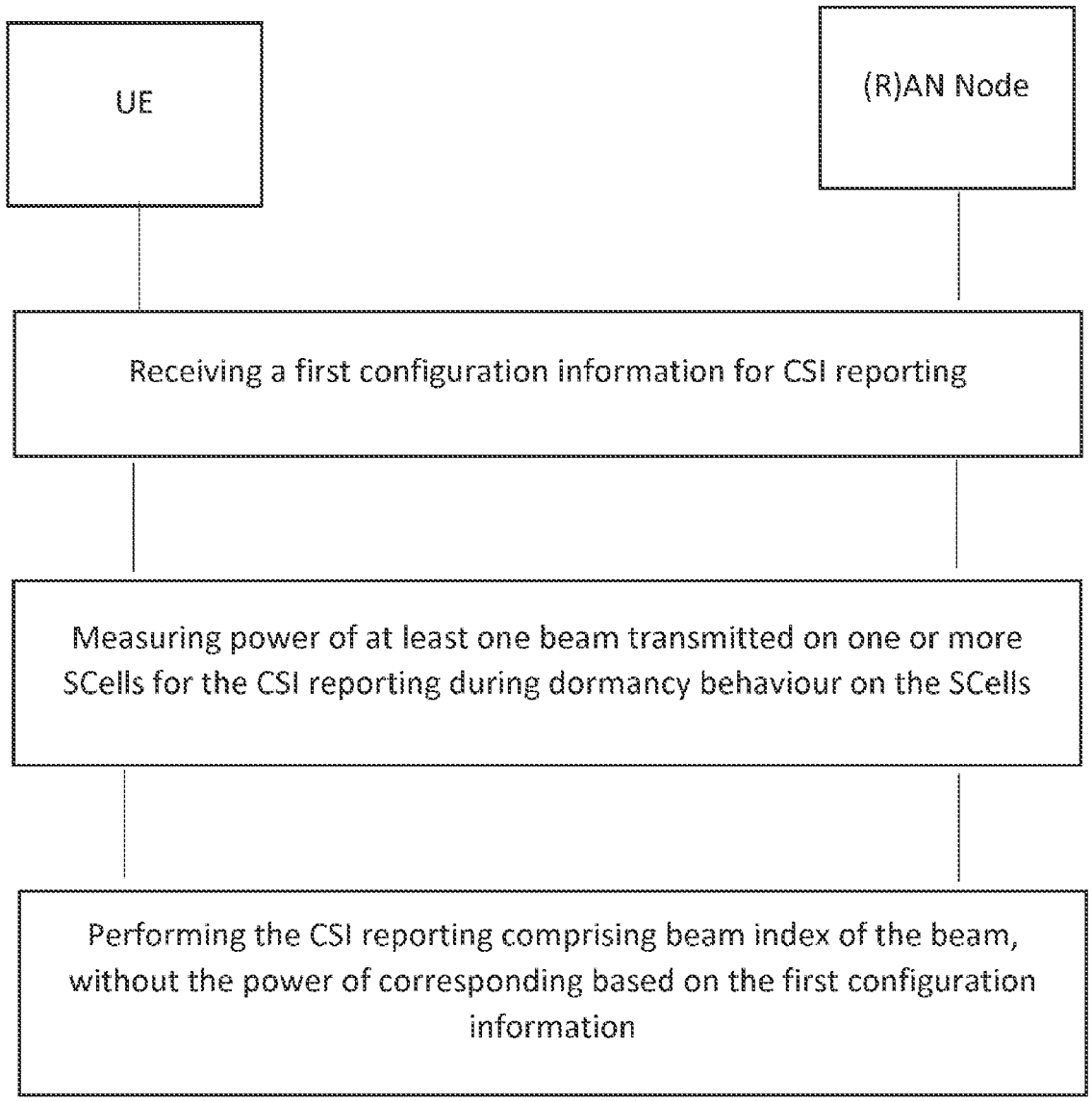
FIG. 5 illustrates signalling flow to facilitate the CSI measurement reporting of one or more Secondary Cells (SCells) during dormancy in accordance with the aspects of the present disclosure.
Figure 6:
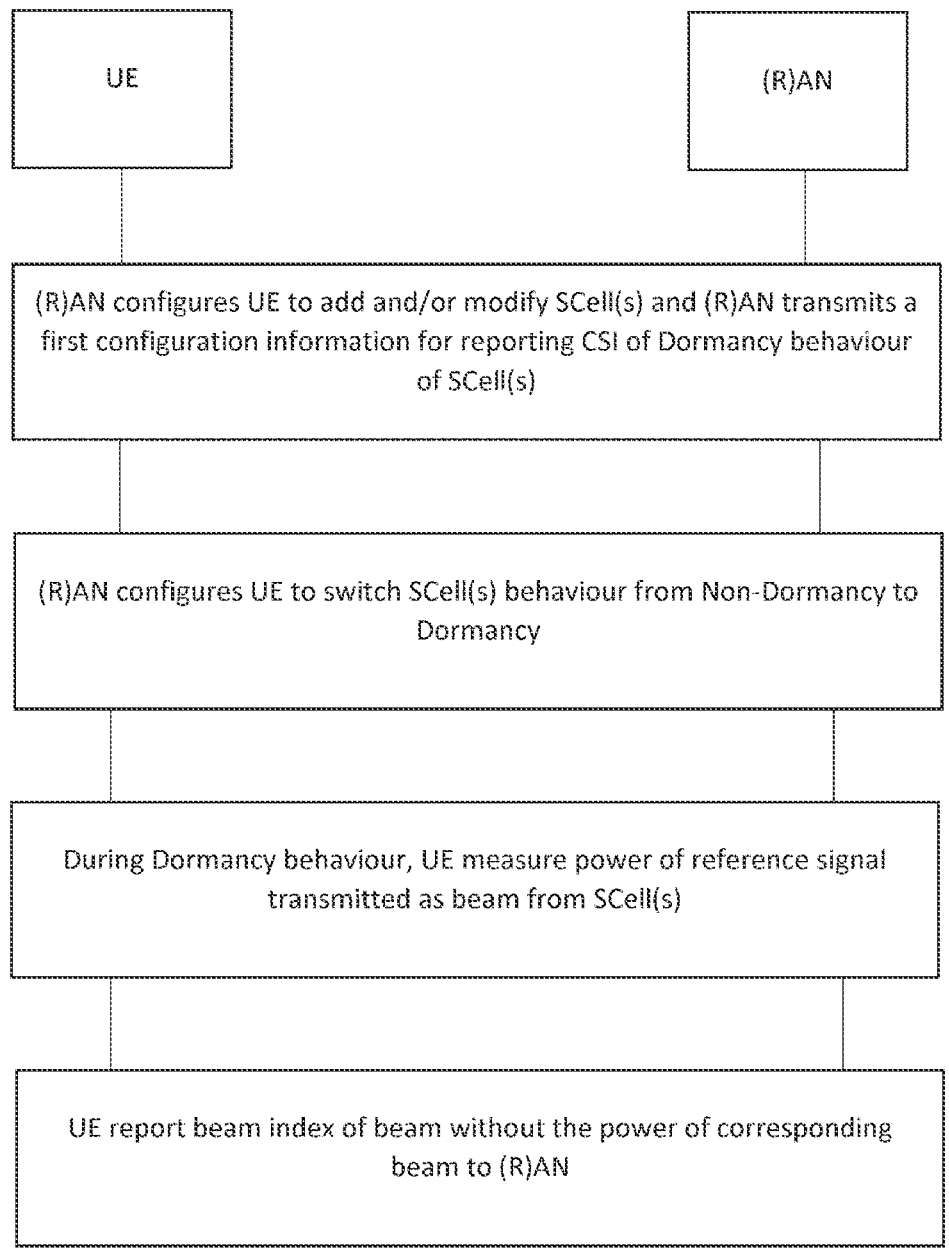
FIG. 6 illustrates signalling flow to facilitate the CSI measurement reporting of one or more secondary cells (SCells) during dormancy in accordance with the aspects of the present disclosure.

Second Aspect of the Present Disclosure:

FIGS. 5 and 6 illustrates signalling flow to facilitate the CSI measurement reporting of one or more Secondary cells (SCells) during dormancy behaviour by the user equipment in accordance with a second aspect of the present disclosure. Radio Station or gNB may configure UE with first configuration information using RRC Connection Reconfiguration message for CSI measurements. The first configuration information may configure the UE to measure power of beam(s) transmitted from one or more SCell(s). The first configuration information configures the UE to report beam index of the beam without the power of corresponding the beam.

Figure 7:
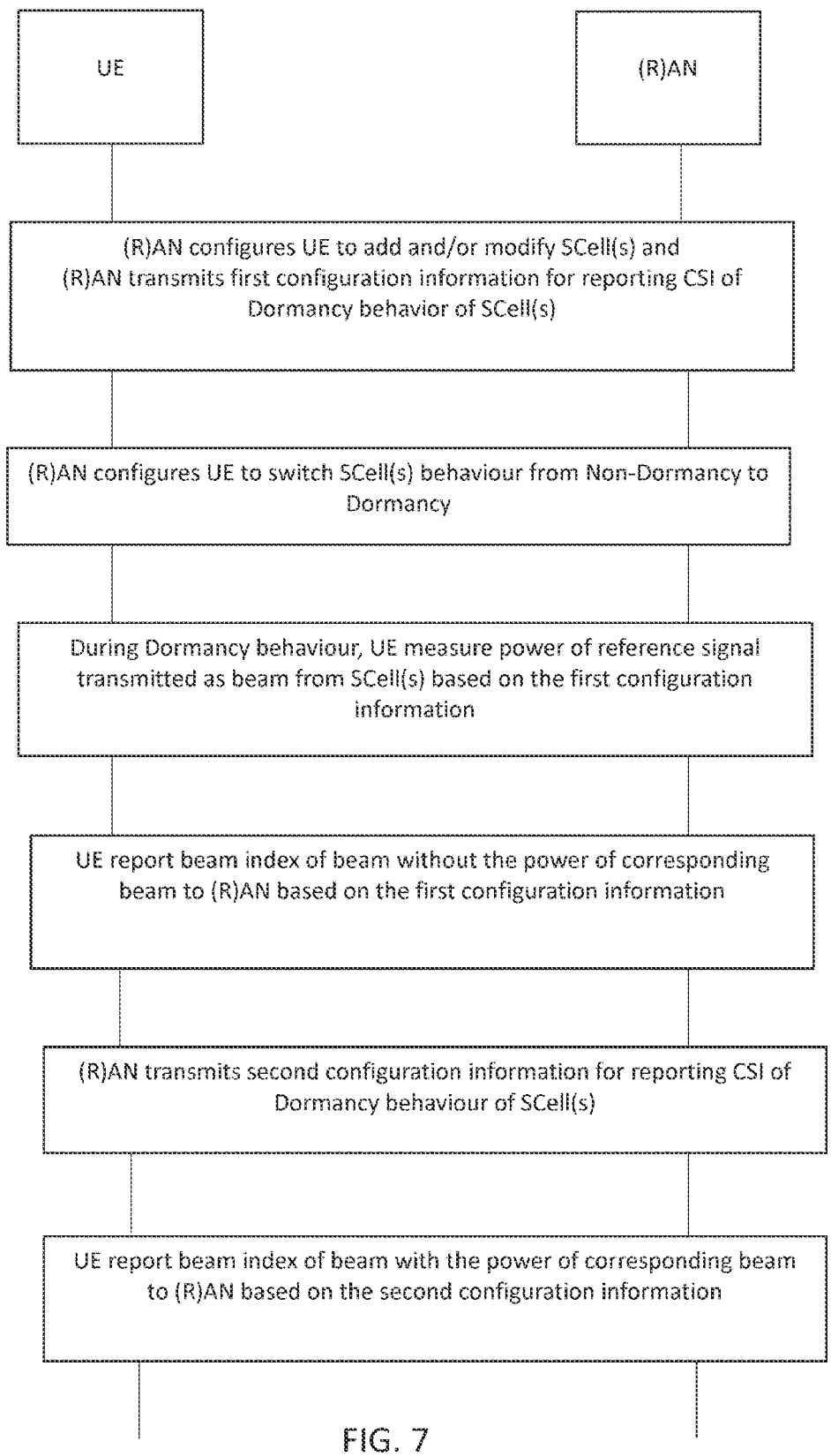
FIG. 7 illustrates signalling flow to facilitate the CSI measurement reporting of one or more secondary cells (SCells) during dormancy and non-dormancy in accordance with the aspects of the present disclosure.

In a dormancy behavior on SCell(s), the UE measures power of at least one beam transmitted from the SCell(s). The measurement may be based on the first configuration information. The UE generate CSI report based on the first configuration information. The CSI report comprises beam index of the beam without the power of corresponding beam. In another aspect, as described in FIG. 7, Radio Station may transmit to UE second configuration information for CSI measurements and/or report. The second configuration information configures UE to report beam index of the beam and the power of corresponding the beam. UE, based on the second configuration information, performs CSI report comprising beam index of the beam and the power of corresponding beam. In this aspect, Radio Station can select whether the power of beam of Dormancy SCell(s) is needed or not. If Radio Station need the power of beam of Dormancy SCell(s), Radio Station configures second configuration information to UE.

Figure 8:
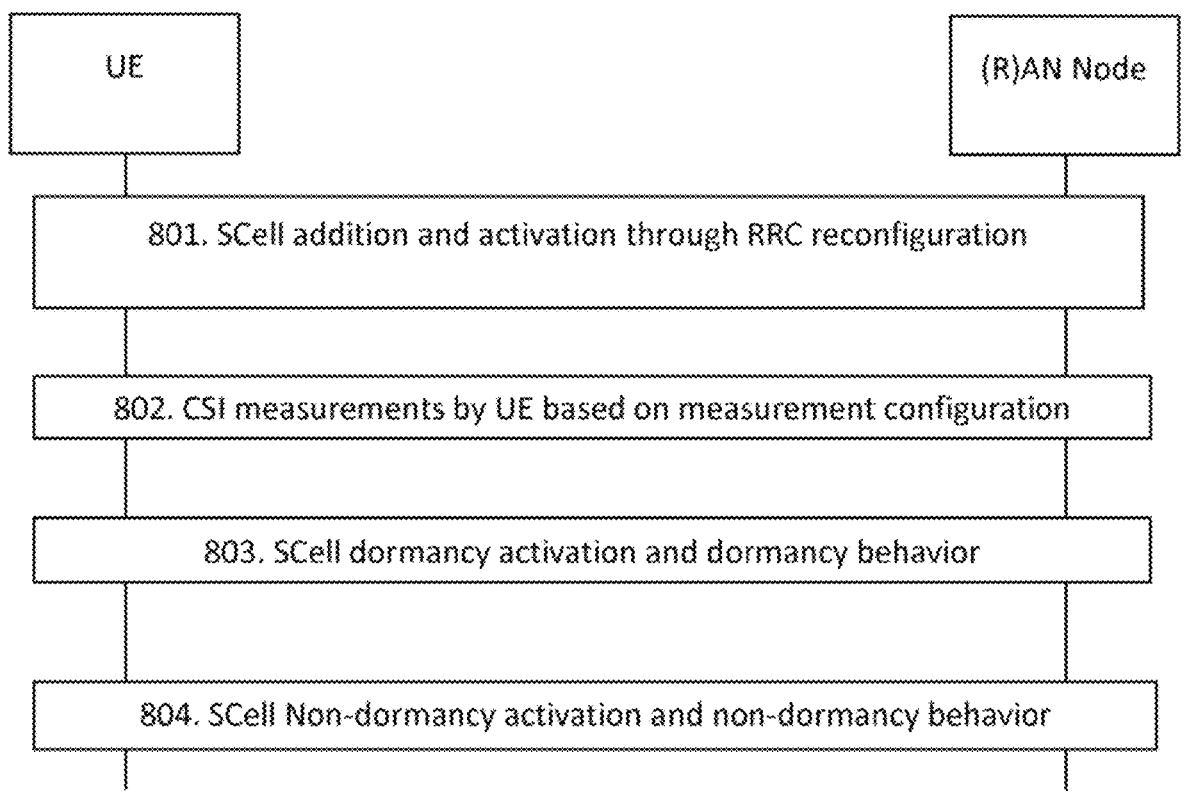
FIG. 8 illustrates call flow during dormancy of activated SCell according to another aspect of the present disclosure.

Third Aspect of the Present Disclosure:

FIG. 8 illustrates call flow for the signaling method(s) design to facilitate the index reporting during dormancy of SCell.

In step 801, Radio station or gNB may configure UE with RRC Connection reconfiguration message to add or modify SCell(s). The RRC Connection reconfiguration message to add or modify SCell(s) also contains CSI measurements configuration. CSI measurement configuration of SCell contains reference signal configuration on which measurements have to be performed and measurements reporting configuration for CSI measurements report. gNB configures UE with the first configuration information including reportQuantity-v16xy. The contents of the IE reportQuantity-v16xy can be designed to contain only CSI-RS Resource Indicator (cri) or SSB-Index (based on the reference signal configuration for CSI measurements).

In some aspects, gNB configures UE with the second configuration information including reportQuantity. The contents of the IE reportQuantity are cri-RSRP or ssb-Index-RSRP based on the RS configured.

Based on the requirement, gNB activates the (configured and added) SCells using MAC CE command. One or more SCells may be activated using single MAC CE command. Upon activation, the SCell may be assumed to be in non-dormancy behavior.

In step 802, when the UE is in dormancy behavior, based on the measurement configuration, UE measures power of at least one beam transmitted on the one or more SCells.

In some aspects, when the UE is in non-dormancy behavior, based on the measurement configuration, UE measures power of at least one beam transmitted on the one or more SCells.

In step 803, whenever there is not enough data to be scheduled on the activated SCell(s), gNB may activate dormancy behavior for certain SCell(s) to reduce UE power consumption.

In some instances, as shown in FIG. 4, when dormancy behaviour is activated UE performs the CSI report including beam index of the beam without the power of corresponding beam to the radio station based on the first configuration information.

In step 804, whenever gNB receives bursty traffic for a particular UE, gNB may ask UE to transition from dormancy behaviour to non-dormancy behaviour on the activated SCell(s). Upon transitioning to non-dormancy behaviour, UE is expected receive data on the non-dormancy SCells. In some instances, when the second configuration information is configured, the UE shall report the beam index with the power of corresponding beam in the CSI report.

Another Instance of the Third Aspect of the Present Disclosure:

In another instance, as part of SCell addition and SCell activation gNB configures UE with RRC Connection reconfiguration message to add or modify SCell(s). The RRC Connection reconfiguration message to add or modify SCell(s) contains CSI measurements configuration. New IEs [reportQuantity (cri-RSRP or ssb-Index-RSRP or cri or ssb-Index)] are introduced to the CSI-ReportConfig RRC message. CSI measurement configuration of SCell contains reference signal configuration on which measurements have to be performed and measurements reporting configuration for CSI measurements reporting.

The contents of the new report quantity type IEs CSI-RS Resource Indicator (cri) or SSB-Index are added to IE reportQuantity to support index reporting. If gNB configures cri in the reportQuantity, UE measures and reports the CSI-RS resource indicator in the CSI measurement report. If gNB configures ssb-Index in the reportQuantity, UE measures and reports the SSB index in the CSI measurement report.

However in this method, network can indicate only one element of report quantity to UE. That is for example either cri-RSRP or ssb-Index-RSRP or cri or ssb-Index. This may put some restriction on the network implementation in some scenarios. However, this will simplify signaling without adding a separate IE to CSI-ReportConfig.

Based on the requirement, gNB activates the (configured and added) SCells using MAC CE command. One or more SCells may be activated using single MAC CE command. Upon activation, the SCell may be assumed to be in non-dormancy behavior.

In another instance, when the UE is in non-dormancy behavior, based on the RRC Connection Reconfiguration message, UE performs CSI measurements on the configured measurement resources and reports the full CSI measurement report to the gNB as per the reporting configuration.

Figure 9:
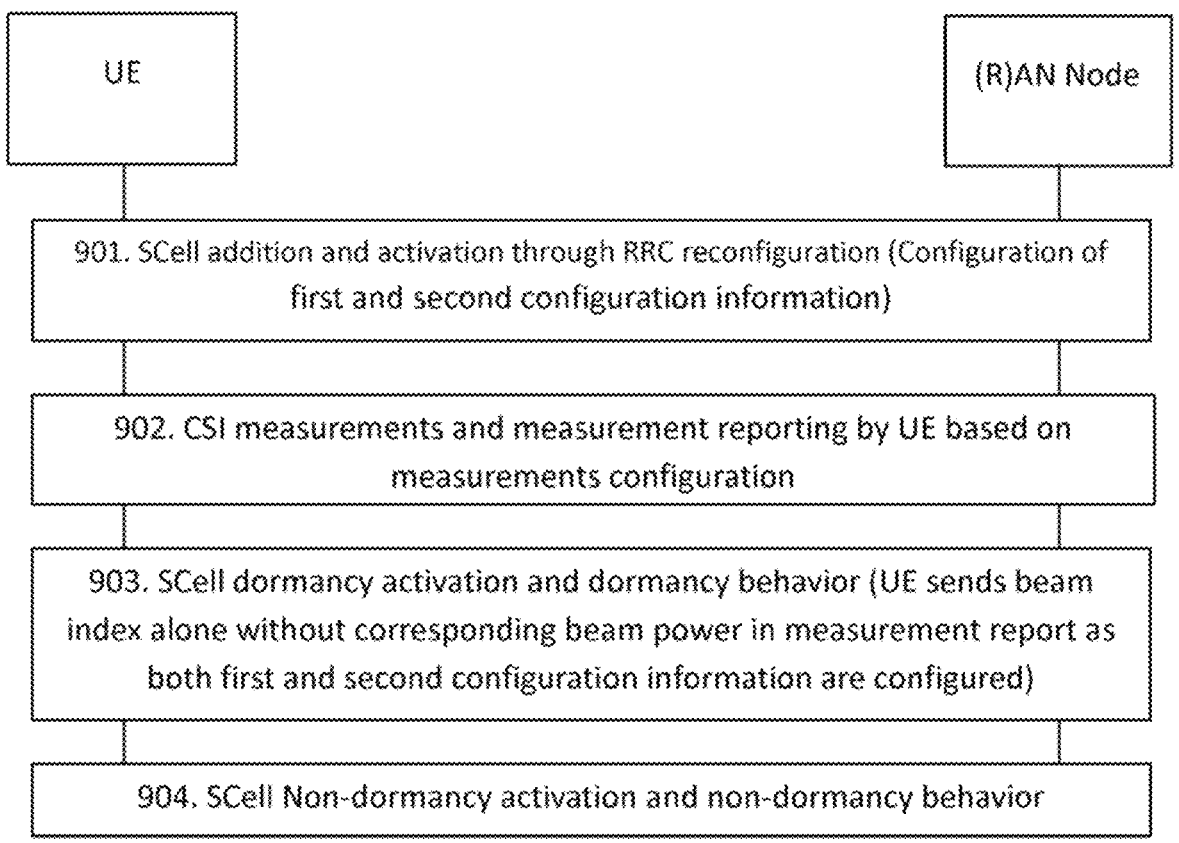
FIG. 9 illustrates call flow of the new UE behavior of transmitting index measurement report during SCell dormancy (when both index and full measurement report are configured) according to another aspects of the present disclosure.

Fourth Aspect of the Present Disclosure:

FIG. 9 illustrates call flow of the new UE behavior of transmitting index measurement report during SCell dormancy (when both index and full measurement report are configured) according to another aspects of the present disclosure.

In step 901, gNB provides configuration for addition or modification of SCell(s) using RRC Connection reconfiguration message for full measurement and index measurement reporting. Based on the requirement, gNB activates the (configured and added) SCells using MAC CE command. One or more SCells may be activated using single MAC CE command. Upon activation, the SCell may be assumed to be in non-dormancy behavior.

In step 902, when the UE is in non-dormancy behavior, based on the RRC Connection Reconfiguration message, UE performs CSI measurements on the configured measurement resources and reports the full CSI measurement report to the gNB as per the reporting configuration.

In step 903, based on the requirement, activated SCell(s) are transitioned from non-dormancy to dormancy behavior. Now, UE is expected to perform AGC, time/frequency tracking, and CSI measurements as per the configuration from the network.

Further, as per the CSI measurement configuration, UE performs measurements on the configured measurement resources.

In some aspects, index reporting is achieved during SCell dormancy without introducing new additional signaling mechanism specifying a UE behavior that is commonly understood at both gNB and UE whenever an activated SCell is transitioned from non-dormancy to dormancy behavior. Even when, gNB configures UE to report full measurement report and index measurement report, if UE enters SCell dormancy on the particular SCell, UE shall be reporting cri or ssb-Index (based on the Reference Signal (RS) as configured).

When gNB configures full measurement report and index measurement report for activated SCells, and if gNB activates dormancy behavior for a particular SCell(s), gNB expects UE to report cri or ssb-Index (depending on the RS is configured) for those SCell(s) which are in dormancy behavior. Defining a UE behavior that is commonly understood at gNB and UE during SCell dormancy helps reducing the signaling overhead.

In step 904, whenever gNB receives bursty traffic for a particular UE, gNB may ask UE to transition from dormancy behaviour to non-dormancy behaviour on activated SCell(s). Upon transitioning to non-dormancy behaviour, since UE is expected receive data on the non-dormancy SCells, UE transmits CSI measurement reports as per the CSI-Report-Config.

Figure 10:
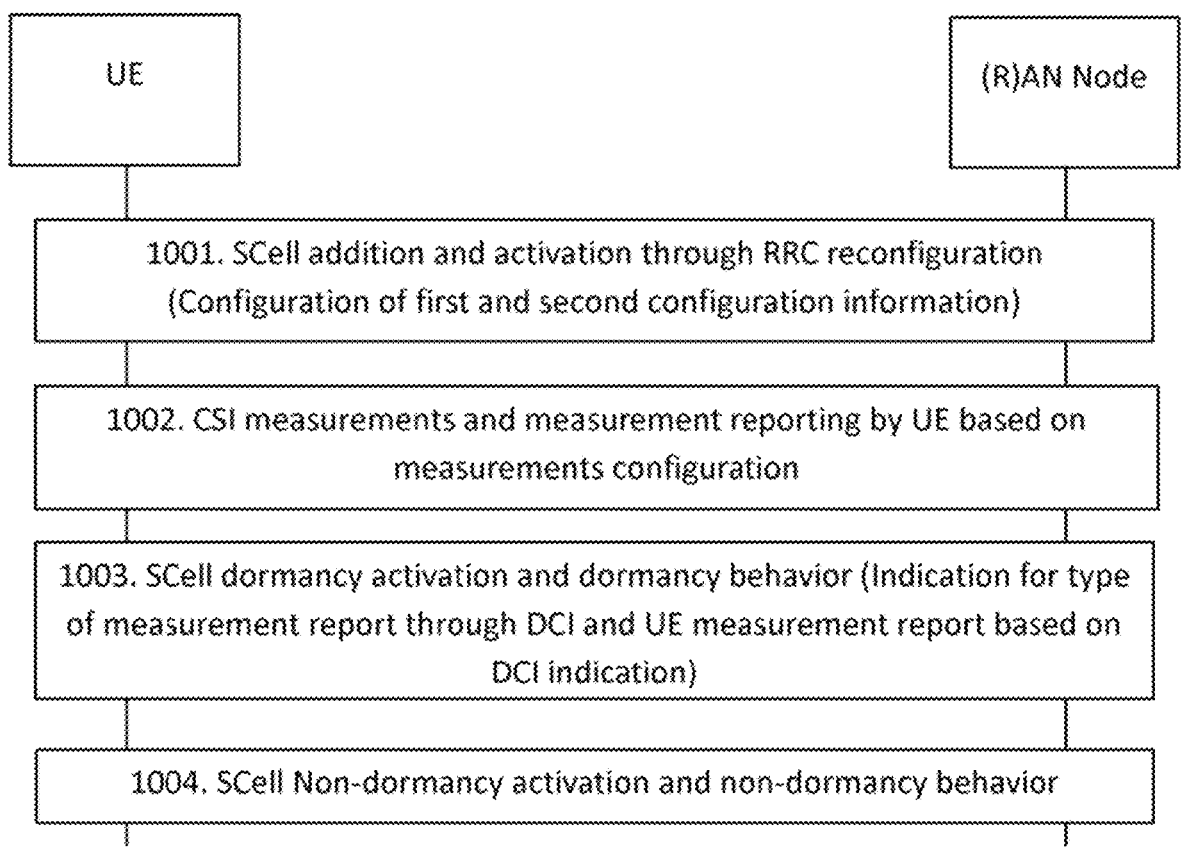
FIG. 10A illustrates call flow of dynamically indicating whether UE to transmit full measurement report or index measurement report during SCell dormancy of activated SCell according to another aspect of the present disclosure.
FIG. 10B illustrates call flow of dynamically indicating (using another preferred signaling method) whether UE to transmit full measurement report or index measurement report during SCell dormancy of activated SCell according to another aspect of the present disclosure.

Fifth Aspect of the Present Disclosure:

FIG. 10A illustrates call flow of dynamically indicating whether UE to transmit full measurement report or index measurement report during SCell dormancy of activated SCell according to another aspect of the present disclosure. One example of this aspect is described below.

In detail, at 1001, gNB provides configuration for addition or modification of SCell(s) using RRC Connection reconfiguration message. gNB configures reportQuantity with either cri-RSRP or ssb-Index-RSRP (based on the RS used) and reportQuantity-v16xy with either cri or ssb-Index (based on the RS used) for UE to report full or index measurement report.

Further, based on the requirement, gNB activates the (configured and added) SCells using MAC CE command. One or more SCells may be activated using single MAC CE command. Upon activation, the SCell may be assumed to be in non-dormancy behavior At 1002, when the UE is in non-dormancy behavior, based on the RRC Connection reconfiguration message, UE performs CSI measurements on the configured measurement resources and reports the full CSI measurement report to the gNB as per the reporting configuration.

At 1003, based on the requirement, activated SCell(s) may be transitioned to dormancy behavior using DCI based BWP switching mechanism.

To indicate the type of measurement report for the dormancy, an additional one bit is introduced to DCI command. The newly introduced one additional bit will indicate whether UE has to report full or index measurement report during the dormancy behavior. RRC configures reportQuantity and reportQuantity-v16xy to indicate the report quantity type for measurement report(s). However, during each instance of dormancy activation, gNB indicates (using DCI) what type of measurement report (full or index) UE has to report for that dormancy instance. For example, the new additional bit may be added to DCI format 1_x at position "n". Here, x in DCI format 1_x can be zero or one (or in future if new DCI formats are introduced, this additional bit can be added to those new DCI formats also).

In a preferred example of UE behavior with the additional 1-bit indication in DCI format 1_x is:

When bit "n" of DCI format 1_x is equal to zero,
  UE shall send cri-RSRP or ssb-Index-RSRP based on the RS configured.
When bit "n" of DCI format 1_x is equal to one,
  UE shall report cri as UE is configured with both cri and cri-RSRP,
  UE shall report ssb-Index as UE is configured with both ssb-Index-RSRP and ssb-Index.

As further described in the 1003, UE is expected to perform AGC, time/frequency tracking, along with the above-mentioned CSI measurements as per the configuration from the network. The solution presented in this disclosure is applicable for L1 CSI reporting framework (mainly for SCell dormancy).

As it is already well known to a person skilled in the art fact RRC Connection Reconfiguration message is slow and time-consuming mechanism that involves interruption of data services during RRC Connection Reconfiguration message. However, the solution described in this aspect (that is RRC configured and DCI down selected for each dormancy instance) do not include frequent RRC Connection Reconfiguration messages for each time gNB has to change the full or index measurement report for each dormancy instance. Hence, it is fast and has less service interruptions. Therefore solution of this aspect has advantages.

At 1004, whenever gNB receives bursty traffic for a particular UE, gNB may ask UE to transition from dormancy behavior to non-dormancy behavior on activated SCell(s). Upon transitioning to non-dormancy behavior, since UE is expected to receive data on the non-dormancy SCells, UE transmits CSI measurement reports as per the CSI-Report-Config.

Figure 10B:
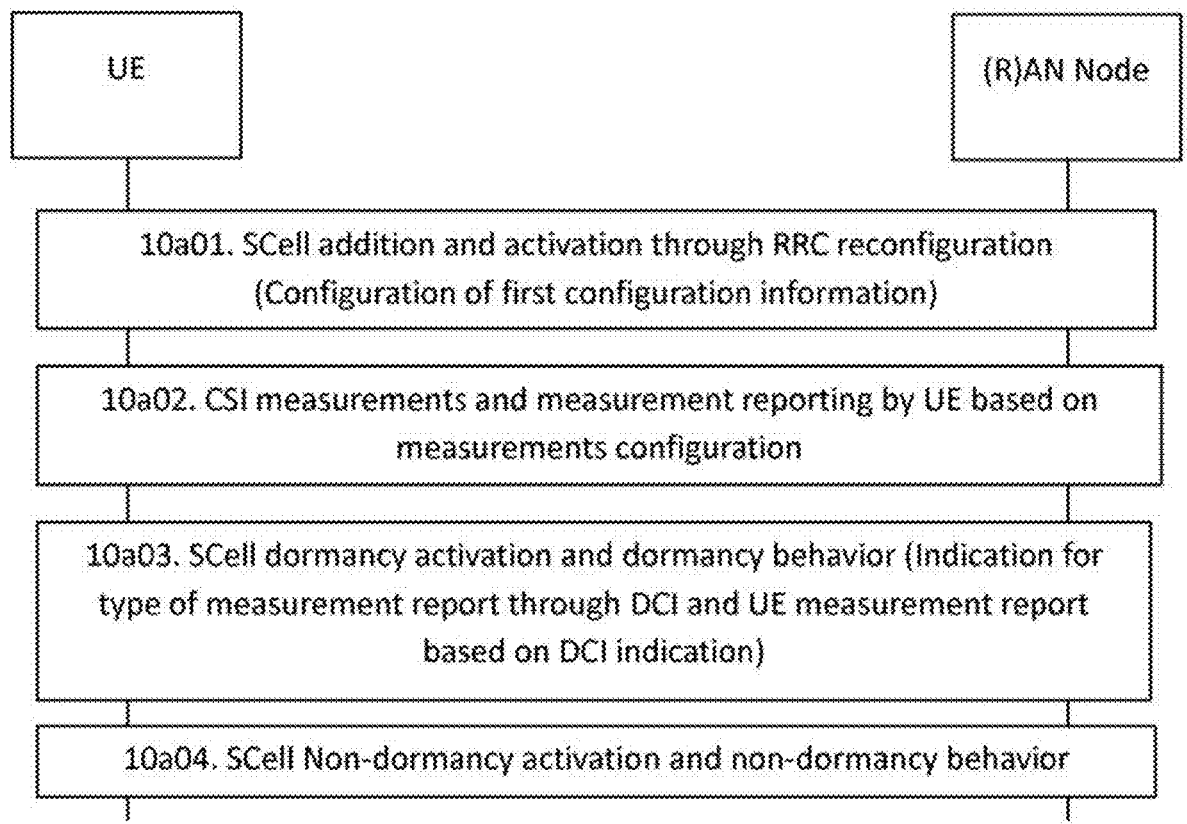

Another Instance of the Fifth Aspect of the Present Disclosure:

FIG. 10B illustrates call flow of another preferred example of dynamically indicating whether UE to transmit full measurement report or index measurement report during SCell dormancy of activated SCell according to another aspect of the present disclosure. Another example of this aspect is described below.

In detail, at 10a01 gNB provides configuration for addition or modification of SCell(s) using RRC Connection Reconfiguration message. gNB configures reportQuantity with either cri-RSRP or ssb-Index-RSRP or cri or ssb-Index (based on the RS used) for UE to report full or index measurement report.

Further, based on the requirement, gNB activates the (configured and added) SCells using MAC CE command. One or more SCells may be activated using single MAC CE command. Upon activation, the SCell may be assumed to be in non-dormancy behavior.

At 10a02, when the UE is in non-dormancy behaviour, based on the RRC Connection Reconfiguration message, UE performs CSI measurements on the configured measurement resources and reports the full CSI measurement report to the gNB as per the reporting configuration.

At 10a03, as described in 603, based on the requirement, activated SCell(s) may be transitioned to dormancy behaviour using BWP switching mechanism.

Further as described 803, DCI command (with newly introduced one additional bit) is used to indicate the type of measurement report (full or index) to be sent during dormancy behaviour instance. RRC configures reportQuantity to indicate the report quantity type for measurement report. However, during each instance of dormancy activation, DCI indicates what type of measurement report (full or index) UE has to report for that dormancy instance.

One preferred example of UE behaviour with the additional 1-bit indication in DCI format 1_x is:

When bit "n" of DCI format 1_x is equal to zero
  UE shall send cri-RSRP or ssb-Index-RSRP if the reportQuantity configuration is cri-RSRP or ssb-index-RSRP respectively.
  UE shall send cri-RSRP or ssb-Index-RSRP if the reportQuantity configuration is cri or ssb-index respectively.
When bit "n" of DCI format 1_x is equal to one
  UE shall send cri or ssb-Index if the reportQuantity configuration is cri-RSRP or ssb-index-RSRP respectively.

UE shall send cri or ssb-Index if the reportQuantity configuration is cri or ssb-index respectively.

At 10a04, whenever gNB receives bursty traffic for a particular UE, gNB may ask UE to transition from dormancy behaviour to non-dormancy behaviour on activated SCell(s). Upon transitioning to non-dormancy behaviour, since UE is expected receive data on the non-dormancy SCells, UE transmits CSI measurement reports as per the CSI-Report-Config.

Figure 11:
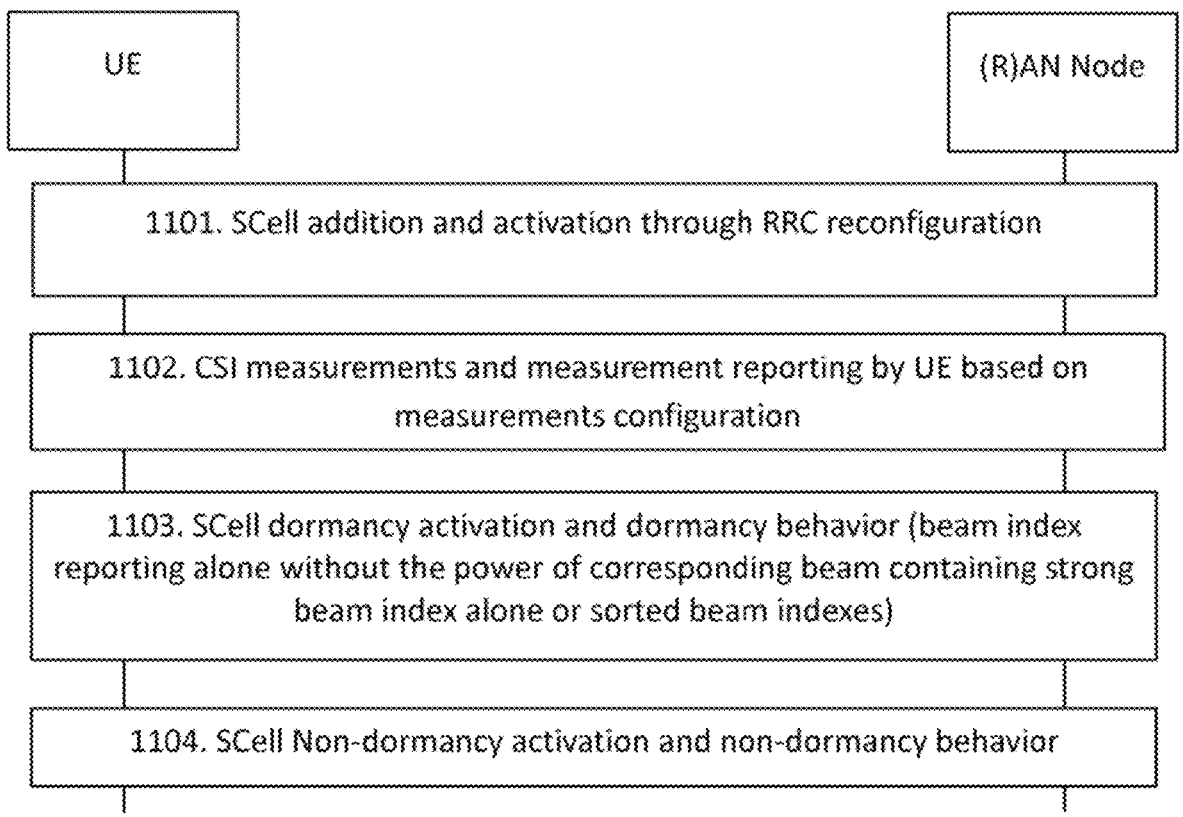
FIG. 11 illustrates call flow describing the contents of the index measurement report to the gNB during SCell dormancy according to another aspect of the present disclosure.

Sixth Aspect of the Present Disclosure:

FIG. 11 illustrates call flow describing the contents of the index measurement report to the gNB during SCell dormancy according to another aspect of the present disclosure.

In detail, at 1101, gNB provides configuration for addition or modification of SCell(s) using RRC Connection Reconfiguration message. Report quantity may be configured using any of the methods described in the previous aspects. Based on the requirement, gNB activates the (configured and added) SCells using MAC CE command. One or more SCells may be activated using single MAC CE command. Upon activation, the SCell may be assumed to be in non-dormancy behavior.

At 1102, when the UE is in non-dormancy behavior, based on the RRC Connection Reconfiguration message, UE performs CSI measurements on the configured measurement resources and reports the full CSI measurement report to the gNB as per the reporting configuration.

In step 1103, dormancy behavior may be activated whenever UE do not have any data to receive or transmit. The measurement report type (to be used) during the dormancy behavior may be indicated to UE using any of the preceding aspects. Based on the CSI measurement configuration, during dormancy duration UE tracks and measures the reference signal for CSI measurement report.

In NR, UE may report upto four strong beams for each measurement-reporting instance. If UE detects more than four beams, then UE will report four strong beams from the set of detected beams. UE beam measurement report contains the reporting of best beam in absolute strength and remaining three beams as differential w.r.t best beam.

In non-dormancy behavior, UE CSI measurement report of beam index and beam strength (RSRP) helps gNB to know how better the next best beam is for beam switching. Beam strength helps a gNB to determine the best beam among the reported set of beams, and switches the serving beam if required.

Whereas, in dormancy behavior, in some scenarios (based on the UE activity and number of dormancy SCells), a gNB may only requires the knowledge of a best beam index alone and may not be the beam strength to enable a UE to transition from dormancy to non-dormancy faster. This can be achieved in multiple methods. In one method, the beam index can be derived by comparing the UE reported measurement values by a gNB. In other method, UE can explicitly suggest the best possible beam index by performing the necessary comparison of the measured values at the UE itself, and just report the selected beam index, or list of sorted beam indices through index reporting to save the measurement reporting resources such as radio resources and UE transmit power.

UE may report beam indexes in sorted order when more than two beams do not differ significantly (in beam strength). By providing a set of indices, this option gives gNB the flexibility to choose a beam index, apart from the best beam, when gNB wishes to optimize the number of beams transmitted (for multiple users). UE may report best beam when there is one strong beam compared to other beams. In addition, in this case the radio resources usage is minimal.

At 1104, whenever gNB receives bursty traffic for a particular UE, gNB may ask UE to transition from dormancy behavior to non-dormancy behavior on activated SCell(s). Upon transitioning to non-dormancy behaviour, since UE is expected receive data on the non-dormancy SCells, UE transmits CSI measurement reports as per the CSI-Report-Config.

Figure 12:
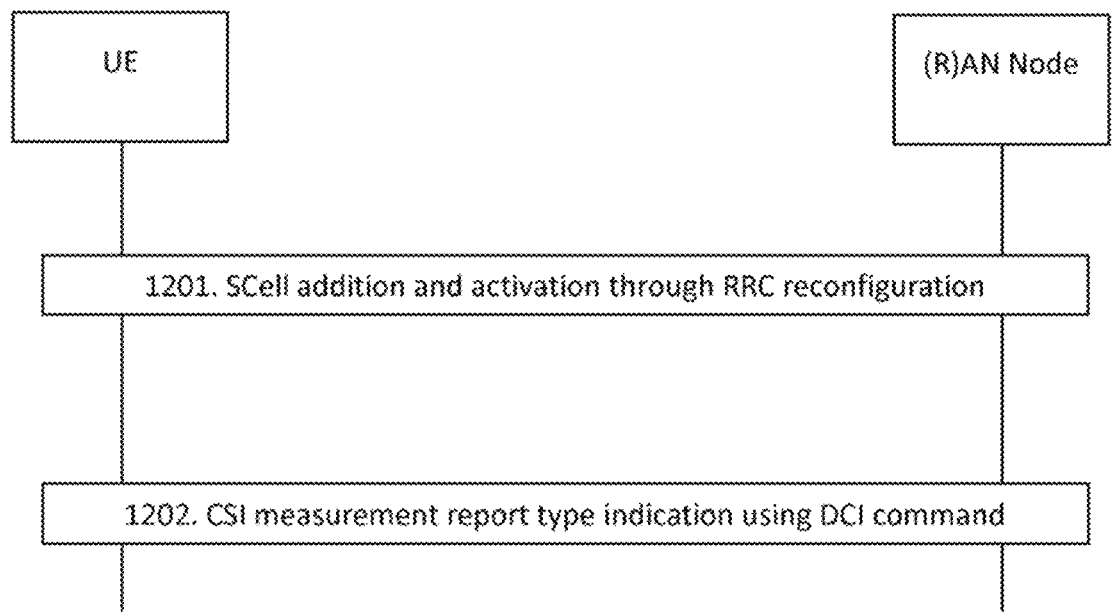
FIG. 12 illustrates other aspect which describes the index measurement report signaling mechanism and the contents of the index measurement report during the non-dormancy behavior to save the reporting resources during non-dormancy behavior according to the aspect of the present disclosure.

Other Aspects of the Present Disclosure:

FIG. 12 illustrates other aspect which describes the index measurement report signaling mechanism and the contents of the index measurement report during the non-dormancy behavior to save the reporting resources during non-dormancy behavior according to the aspect of the present disclosure.

In detail, at 1201, gNB configures reportQuantity with either cri-RSRP or ssb-Index-RSRP (based on the RS used) and reportQuantity-v16xy with either cri or ssb-Index (based on the RS used) for UE to report full or index measurement report. Based on the requirement, gNB activates the (configured and added) SCells using MAC CE command. One or more SCells may be activated using single MAC CE command. Upon activation, the SCell(s) may be assumed to be in non-dormancy behavior.

At 1202, when the UE is in non-dormancy behavior, based on the RRC Connection Reconfiguration message, UE performs CSI measurements on the configured measurement resources and the CSI reporting is done based on the indication received from the network in DCI command. DCI command contains newly introduced one additional bit to indicate whether UE has to report full or index measurement report during the non-dormancy behavior. RRC configures reportQuantity and reportQuantity-v16xy to indicate the report quantity type for measurement report. However, network will further down selects which type of measurement report (full or index) UE has to report using DCI. Network can change the type of report dynamically using DCI.

For example, the new one additional bit may be added to DCI format 1_x at position "n". Here, x in DCI format 1_x can be zero or one (or in future if there are new DCI format are introduced this additional bit can be added to those new DCI formats also). As described above, network indicates which type of measurement report (full or index measurement report) to be reported by UE.

When bit "n" of DCI format 1_x is equal to zero, UE shall report full measurement report.

When bit "n" of DCI format 1_x is equal to one, UE shall report index report.

If the DCI format 1_x is equal to 0 full measurement report as per the existing procedure is reported. That is cri-RSRP or ssb-Index-RSRP is reported based on the RS configured.

If the DCI format 1_x is equal to 1, index measurement report shall be reported. That means UE have to report only beam indexes and not beam strength. UE determines whether to report sorted beam indexes or best beam index is determined as per the procedure described in previous aspect.

In other words, UE reports beam indices in a sorted order when more than two beam strengths do not differ significantly. UE reports only the best beam index when there is one strong beam compared to other beams. UE reports in same measurement report type till network indicate the change of measurement report type to UE using another DCI command.

In other aspects, UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated by a person skilled in the art that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 1

Some examples of machine type communication applications.

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ | Sensors |
| Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |

TABLE 1-continued

Some examples of machine type communication applications.

| Service Area | MTC applications |
| --- | --- |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

The present disclosure is applicable to all types of on-chip and off chip memories used in various in digital electronic circuitry, or in hardware, firmware, or in computer hardware, firmware, software, or in combination thereof. Apparatus of the disclosure can be implemented in a computer program product tangibly embodied in a machine-readable storage device for execution by a programmable processor; and methods actions can be performed by a programmable processor executing a program of instructions to perform functions of the disclosure by operating on input data and generating output. The disclosure can be implemented advantageously on a programmable system including at least one input device, and at least one output device. Each computer program can be implemented in a high-level procedural or object-oriented programming language or in assembly or machine language, if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches and/or flip flops. Any of the foregoing can be supplemented by, or incorporated in ASICs (application-specific integrated circuits), FPGAs (field-programmable gate arrays) and/or DSPs(digital signal processors).

It will be apparent to those having ordinary skill in this art that various modifications and variations may be made to the aspects disclosed herein, consistent with the present disclosure, without departing from the spirit and scope of the present disclosure. Other aspects consistent with the present disclosure will become apparent from consideration of the specification and the practice of the description disclosed herein.

For example, the whole or part of the exemplary embodiments disclosed above can be described as, but not limited to, the following supplementary notes.

(Supplementary Note 1)

A method implemented in a user equipment, UE, for reporting channel state information, CSI, of one or more secondary serving cells, SCells, of a radio station wherein the method comprising:

receiving, from the radio station, first configuration information for reporting CSI for one or more SCells of the radio station;

measuring power of at least one beam transmitted on the one or more SCells for reporting the CSI in a case where the UE is during dormancy behaviour on the one or more SCells wherein the dormancy behavior is a behavior in which the UE monitors downlink control channel a fewer times on the SCells than the UE in SCell active state behavior, or is a behavior in which the UE does not monitors the downlink control channel; and reporting the CSI comprising beam index of the at least one beam, without the power of corresponding a beam of the at least one beam to the radio station based on the first configuration information.

(Supplementary Note 2)

The method according to Supplementary note 1, further comprising, during dormancy behaviour, monitoring the downlink control channel a fewer times on the SCells. SCells than the UE in SCell active state behavior.

(Supplementary Note 3)

The method according to Supplementary note 1, further comprising receiving, from the radio station, second configuration information for reporting CSI; and reporting, to the radio station, the CSI comprising the beam index of the at least one beam with the power of corresponding the beam of the at least one beam based on the second configuration information.

(Supplementary Note 4)

The method according to Supplementary note 3, wherein the second configuration information is applied for the reporting the CSI during non-dormancy behavior.

(Supplementary Note 5)

The method according to Supplementary note 1, further comprising receiving, from the radio station, signaling information for switching from the non-dormancy behaviour to the dormancy behaviour, wherein the reporting the CSI comprising the beam index of the at least one beam without the power of corresponding the beam of the at least one beam based on the first configuration information is performed in response to the signaling information.

(Supplementary Note 6)

The method according to Supplementary note 3, further comprising:

receiving, from the radio station, an indicator indicating whether the UE uses the first configuration information or the second configuration information for reporting the CSI;

wherein the reporting the CSI comprising the beam index of the at least one beam without the power of corresponding the beam of the at least one beam to the radio station, is performed in a case where the indicator indicates to use the first configuration information, wherein the reporting the CSI comprising the beam index of the at least one beam with the power of corresponding the beam of the at least one beam to the radio station is performed in a case where the indicator indicates to use the second configuration information.

(Supplementary Note 7)

A user equipment, UE, comprising:

at least one transceiver; and at least one processor, wherein the at least one transceiver is configured to receive, from a radio station, first configuration information for reporting channel state information, CSI for one or more secondary serving cells, SCells, of the radio station;

the at least one processor is configured to measure power of at least one beam transmitted on the one or more SCells for the CSI in a case where the UE is during dormancy behavior on the SCells, wherein the dormancy behavior is a behavior in which the UE monitors downlink control channel a fewer times on the SCells than the UE in SCell active state behavior, or is a behavior in which the UE does not monitors the downlink control channel; and the at least one transceiver is configured to report, to the radio station, the CSI comprising beam index of the at least one beam without the power of corresponding a beam of the at least one beam based on the first configuration information.

(Supplementary Note 8)

The UE according to Supplementary note 7, wherein the UE, during dormancy behaviour, monitors the downlink control channel a fewer times on the SCells than the UE in SCell active state behavior.

(Supplementary Note 9)

The UE according to Supplementary note 7, wherein the at least one transceiver is configured to receive, from the radio station, second configuration information for reporting the CSI; and report, to the radio station, the CSI comprising the beam index of the at least one beam with the power of corresponding the beam of the at least one beam based on the second configuration information.

(Supplementary Note 10)

The UE according to Supplementary note 9, wherein the second configuration information is applied for reporting the CSI during non-dormancy behavior.

(Supplementary Note 11)

The UE according to Supplementary note 7, wherein the at least one transceiver is configured to:

receive, from the radio station, a signaling information to switch from the non-dormancy behaviour to the dormancy behaviour; and perform the CSI reporting comprising the beam index of the at least one beam without the power of corresponding the beam of the at least one beam based on the first configuration information, in response to the signaling information.

(Supplementary Note 12)

The UE according to Supplementary note 7, wherein the at least one transceiver is configured to:

receive, from the radio station, an indicator indicating whether the UE to use the first configuration information or the second configuration information for reporting the CSI;

wherein the CSI comprises the beam index of the at least one beam without the power of corresponding the beam of the at least one beam, to the radio station, in a case where the indicator indicates to use the first configuration information, wherein the CSI reporting comprises the beam index of the at least one beam with the power of corresponding the beam of the at least one beam to the radio station, in a case where the indicator indicates to use the second configuration information.

(Supplementary Note 13)

A method implemented in a radio station, for configuring channel state information, CSI, reporting of one or more secondary serving cells, SCells, of the radio station, during dormancy behaviour on the SCells of a user equipment, UE, the method comprising:

transmitting, to the UE, a first configuration information for the CSI reporting for one or more SCells of the radio station;

receiving, from the UE, the CSI reporting during dormancy behaviour on one or more SCells, wherein the dormancy behavior is a behavior in which the UE monitors downlink control channel a fewer times on the SCells than the UE in SCell active state behavior, or is a behavior in which the UE does not monitors the downlink control channel;

wherein the CSI reporting comprising beam index of at least one beam on the SCells without power of corresponding a beam of the at least one beam based on the first configuration information.

(Supplementary Note 14)

The method according to Supplementary note 13, further comprising, during dormancy behaviour, monitoring the downlink control channel a fewer times on the SCells than the UE in SCell active state behavior.

(Supplementary Note 15)

The method according to Supplementary note 13, further comprising transmitting, to the UE, a second configuration information for the CSI report; wherein the second configuration information configures the UE to report the beam index of the at least one beam with the power of corresponding the beam of the at least one beam in the CSI report.

(Supplementary Note 16)

The method according to Supplementary note 13, wherein the second configuration information is applied for the CSI reporting during non-dormancy behavior.

(Supplementary Note 17)

The method according to Supplementary note 13, further comprising transmitting, to the UE, a signaling information to switch from the non-dormancy behaviour to the dormancy behaviour; and receiving the CSI reporting comprising the beam index of the at least one beam without the power of corresponding the beam of the at least one beam based on the first configuration information, in response to the signaling information.

(Supplementary Note 18)

The method according to Supplementary note 13, further comprising:

transmitting, to the UE, an indicator indicating whether the UE uses the first configuration information or the second configuration information for the CSI reporting;

wherein the indicator indicates the UE to use the first configuration information, expecting the UE to report the beam index of the at least one beam without the power of corresponding the beam of the at least one beam to the radio station; and wherein the indicator indicates the UE to use the second configuration information, expecting the UE to report the beam index of the at least one beam with the power of corresponding the beam of the at least one beam to the radio station.

(Supplementary Note 19)

A radio station comprising:

at least one transceiver; and at least one processor;

wherein the at least one transceiver is configured to:

transmit, to a user equipment, UE, a first configuration information for channel state information, CSI, reporting of one or more secondary cells, SCells, of the radio station, during dormancy behaviour by the UE, wherein the dormancy behavior is a behavior in which the UE monitors downlink control channel a fewer times on the SCells than the UE in SCell active state behavior, or is a behavior in which the UE does not monitors the downlink control channel;

receive, from the UE, the CSI report comprising beam index of at least one beam on the one or more SCells without power of corresponding a beam of the at least one beam based on the first configuration information.

(Supplementary Note 20)

The radio station according to Supplementary note 19, wherein the UE, during dormancy behaviour, monitors the downlink control channel fewer times on the SCells than the UE in SCell active state behavior.

(Supplementary Note 21)

The radio station according to Supplementary note 19, wherein the at least one transceiver is further configured to transmit a second configuration information to the UE, for the CSI reporting, wherein the second configuration information configures the UE to report the beam index of the at least one beam with the power of corresponding the beam of the at least one beam in the CSI report.

(Supplementary Note 22)

The radio station according to Supplementary note 21, wherein the second configuration information is applied for the CSI reporting during non-dormancy behavior.

(Supplementary Note 23)

The radio station according to Supplementary note 19, wherein the at least one transceiver is further configured to:

transmit, to the UE, a signaling information to switch from the non-dormancy behaviour to the dormancy behaviour; and receive, from the UE, the CSI reporting comprising the beam index of the at least one beam without the power of corresponding the beam of the at least one beam based on the first configuration information, in response to the signaling information.

(Supplementary Note 24)

The radio station according to Supplementary note 19, wherein the at least one transceiver is further configured to:

transmit, to the UE, an indicator indicating whether the UE uses the first configuration information or the second configuration information for the CSI report;

wherein when the radio station indicates the UE to use the first configuration information, the radio station expects the UE to report the beam index of the at least one beam without the power of corresponding the beam of the at least one beam to the radio station; and wherein when the radio station indicates the UE to use the second configuration, the radio station expects the UE to report the beam index of the at least one beam with the power of corresponding the beam of the at least one beam to the radio station.

This application is based upon and claims the benefit of priority from India Patent Application No. 202011013694, filed on Mar. 28, 2020, the disclosure of which is incorporated herein in its entirety by reference.

REFERENCE SIGNS LIST 100 wireless network
101 Radio Stations
102 Radio Stations
103 Radio Stations
104 network(Internet)
120 coverage area
125 coverage area
201 TX processing circuitry
202 RX processing circuitry
203 controller/processor
204 memory
205 cell activation component
301 RF transceiver
302 TX processing circuitry
303 RX processing circuitry
304 controller/processor
305 memory
306 cell activation component

What is claimed is:

1. A method implemented in a user equipment, UE, for reporting channel state information, CSI, of one or more secondary serving cells, SCells, of a radio station wherein the method comprising:
   receiving, from the radio station, first configuration information for reporting CSI for one or more SCells of the radio station;
   measuring power of at least one beam transmitted on the one or more SCells for reporting the CSI in a case where the UE is during dormancy behaviour on the one or more SCells wherein the dormancy behavior is a behavior in which the UE monitors downlink control channel a fewer times on the SCells than the UE in SCell active state behavior, or is a behavior in which the UE does not monitors the downlink control channel; and
   reporting the CSI comprising beam index of the at least one beam, without the power of corresponding a beam of the at least one beam to the radio station based on the first configuration information.

2. The method according to claim 1, further comprising, during dormancy behaviour, monitoring the downlink control channel a fewer times on the SCells than the UE in SCell active state behavior.

3. The method according to claim 1, further comprising receiving, from the radio station, second configuration information for reporting CSI; and
   reporting, to the radio station, the CSI comprising the beam index of the at least one beam with the power of corresponding the beam of the at least one beam based on the second configuration information.

4. The method according to claim 3, wherein the second configuration information is applied for the reporting the CSI during non-dormancy behavior.

5. The method according to claim 3, further comprising:
   receiving, from the radio station, an indicator indicating whether the UE uses the first configuration information or the second configuration information for reporting the CSI;
   wherein the reporting the CSI comprising the beam index of the at least one beam without the power of corresponding the beam of the at least one beam to the radio station, is performed in a case where the indicator indicates to use the first configuration information,
   wherein the reporting the CSI comprising the beam index of the at least one beam with the power of corresponding the beam of the at least one beam to the radio station is performed in a case where the indicator indicates to use the second configuration information.

6. The method according to claim 1, further comprising receiving, from the radio station, signaling information for switching from the non-dormancy behaviour to the dormancy behaviour,
   wherein the reporting the CSI comprising the beam index of the at least one beam without the power of corresponding the beam of the at least one beam based on the first configuration information is performed in response to the signaling information.

7. A user equipment, UE, comprising:
   at least one transceiver; and
   at least one processor, wherein
   the at least one transceiver is configured to receive, from a radio station, first configuration information for reporting channel state information, CSI for one or more secondary serving cells, SCells, of the radio station;
   the at least one processor is configured to measure power of at least one beam transmitted on the one or more SCells for the CSI in a case where the UE is during dormancy behavior on the SCells, wherein the dormancy behavior is a behavior in which the UE monitors downlink control channel a fewer times on the SCells than the UE in SCell active state behavior, or is a behavior in which the UE does not monitors the downlink control channel; and
   the at least one transceiver is configured to report, to the radio station, the CSI comprising beam index of the at least one beam without the power of corresponding a beam of the at least one beam based on the first configuration information.

8. The UE according to claim 7, wherein the UE, during dormancy behaviour, monitors the downlink control channel a fewer times on the SCells than the UE in SCell active state behavior.

9. The UE according to claim 7, wherein the at least one transceiver is configured to
   receive, from the radio station, second configuration information for reporting the CSI; and
   report, to the radio station, the CSI comprising the beam index of the at least one beam with the power of corresponding the beam of the at least one beam based on the second configuration information.

10. The UE according to claim 9, wherein the second configuration information is applied for reporting the CSI during non-dormancy behavior.

11. The UE according to claim 7, wherein
   the at least one transceiver is configured to:
   receive, from the radio station, a signaling information to switch from the non-dormancy behaviour to the dormancy behaviour; and
   perform the CSI reporting comprising the beam index of the at least one beam without the power of corresponding the beam of the at least one beam based on the first configuration information, in response to the signaling information.

12. The UE according to claim 7, wherein the at least one transceiver is configured to:
receive, from the radio station, an indicator indicating whether the UE to use the first configuration information or the second configuration information for reporting the CSI;
wherein the CSI comprises the beam index of the at least one beam without the power of corresponding the beam of the at least one beam, to the radio station, in a case where the indicator indicates to use the first configuration information,
wherein the CSI reporting comprises the beam index of the at least one beam with the power of corresponding the beam of the at least one beam to the radio station, in a case where the indicator indicates to use the second configuration information.

13. A radio station comprising:
at least one transceiver; and
at least one processor;
wherein the at least one transceiver is configured to:
transmit, to a user equipment, UE, a first configuration information for channel state information, CSI, reporting of one or more secondary cells, SCells, of the radio station, during dormancy behaviour by the UE, wherein the dormancy behavior is a behavior in which the UE monitors downlink control channel a fewer times on the SCells than the UE in SCell active state behavior, or is a behavior in which the UE does not monitors the downlink control channel;
receive, from the UE, the CSI report comprising beam index of at least one beam on the one or more SCells without power of corresponding a beam of the at least one beam based on the first configuration information.

14. The radio station according to claim 13, wherein the UE, during dormancy behaviour, monitors the downlink control channel fewer times on the SCells than the UE in SCell active state behavior.

15. The radio station according to claim 13, wherein the at least one transceiver is further configured to transmit a second configuration information to the UE, for the CSI reporting, wherein the second configuration information configures the UE to report the beam index of the at least one beam with the power of corresponding the beam of the at least one beam in the CSI report.

16. The radio station according to claim 15, wherein the second configuration information is applied for the CSI reporting during non-dormancy behavior.

17. The radio station according to claim 13, wherein the at least one transceiver is further configured to:
transmit, to the UE, a signaling information to switch from the non-dormancy behaviour to the dormancy behaviour; and
receive, from the UE, the CSI reporting comprising the beam index of the at least one beam without the power of corresponding the beam of the at least one beam based on the first configuration information, in response to the signaling information.

18. The radio station according to claim 13, wherein the at least one transceiver is further configured to:
transmit, to the UE, an indicator indicating whether the UE uses the first configuration information or the second configuration information for the CSI report;
wherein when the radio station indicates the UE to use the first configuration information, the radio station expects the UE to report the beam index of the at least one beam without the power of corresponding the beam of the at least one beam to the radio station; and
wherein when the radio station indicates the UE to use the second configuration, the radio station expects the UE to report the beam index of the at least one beam with the power of corresponding the beam of the at least one beam to the radio station.

* * * * *